United States Patent
Poliakov et al.

(10) Patent No.: US 10,891,797 B1
(45) Date of Patent: *Jan. 12, 2021

(54) MODIFYING MULTIPLE OBJECTS WITHIN A VIDEO STREAM

(71) Applicant: Snap Inc., Santa Monica, CA (US)

(72) Inventors: Fedir Poliakov, Marina Del Rey, CA (US); Oleksandr Pyshchenko, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/561,610

(22) Filed: Sep. 5, 2019

Related U.S. Application Data

(63) Continuation of application No. 15/801,814, filed on Nov. 2, 2017, now Pat. No. 10,445,938.

(Continued)

(51) Int. Cl.
| | |
|---|---|
| *G09G 5/00* | (2006.01) |
| *G06T 19/00* | (2011.01) |
| *G06T 3/40* | (2006.01) |
| *G06T 7/246* | (2017.01) |
| *G06T 7/73* | (2017.01) |

(Continued)

(52) U.S. Cl.
CPC .............. *G06T 19/006* (2013.01); *G06T 3/40* (2013.01); *G06T 7/246* (2017.01); *G06T 7/62* (2017.01); *G06T 7/73* (2017.01); *H04N 7/157* (2013.01); *G06T 2207/10016* (2013.01); *G06T 2207/30201* (2013.01)

(58) Field of Classification Search
CPC ....... G06T 19/006; G06T 19/00; G06F 3/011; G06F 3/012; G02B 27/017

USPC ......................................................... 345/633
See application file for complete search history.

(56) References Cited

U.S. PATENT DOCUMENTS

| | | |
|---|---|---|
| 6,038,295 A | 3/2000 | Mattes |
| 6,417,969 B1 | 7/2002 | Deluca et al. |

(Continued)

FOREIGN PATENT DOCUMENTS

CA 2887596 A1 7/2015

OTHER PUBLICATIONS

Wang, H., Videoshop: A new framework for spatio-temporal video editing in gradient domain, Date Aug. 21, 2006, [Retrieved on Feb. 13, 2019], Retrieved from the Internet: <URL: https://www.sciencedirect.com/science/article/pii/S1524070306000439> (Year: 2006).*

(Continued)

*Primary Examiner* — Gordon G Liu

(74) *Attorney, Agent, or Firm* — Schwegman Lundberg & Woessner, P.A.

(57) ABSTRACT

Systems, devices, media, and methods are presented for presentation of modified objects within a video stream. The systems and methods receive a set of images within a video stream and identify at least a portion of a face in a first subset of images. The systems and methods determine face characteristics by analyzing the portion of the face in the first subset of images. The systems and methods apply a graphical representation of glasses to the face based on the face characteristics and cause presentation of a modified video stream including the portion of the face with the graphical representation of the glasses in a second subset of images of the set of images while receiving the video stream.

20 Claims, 18 Drawing Sheets

Related U.S. Application Data

(60) Provisional application No. 62/419,869, filed on Nov. 9, 2016.

(51) Int. Cl.
*H04N 7/15* (2006.01)
*G06T 7/62* (2017.01)

(56) References Cited

U.S. PATENT DOCUMENTS

| | | |
|---|---|---|
| 6,980,909 B2 | 12/2005 | Root et al. |
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 9,671,863 B2 | 6/2017 | Fein et al. |
| 10,445,938 B1 | 10/2019 | Poliakov et al. |
| 2003/0133599 A1 | 7/2003 | Tian et al. |
| 2010/0245387 A1 | 9/2010 | Bachelder et al. |
| 2011/0202598 A1 | 8/2011 | Evans et al. |
| 2012/0209924 A1 | 8/2012 | Evans et al. |
| 2013/0169923 A1 | 7/2013 | Schnoll et al. |
| 2015/0279113 A1* | 10/2015 | Knorr .................. G06T 7/11 345/633 |
| 2016/0035133 A1 | 2/2016 | Ye et al. |

OTHER PUBLICATIONS

U.S. Appl. No. 15/801,814, filed Nov. 2, 2017, Modifying Multiple Objects Within a Video Stream.

"U.S. Appl. No. 15/801,814, Final Office Action dated May 30, 2019", 33 pgs.

"U.S. Appl. No. 15/801,814, Non Final Office Action dated Feb. 19, 2019", 41 pgs.

"U.S. Appl. No. 15/801,814, Notice of Allowance dated Jul. 17, 2019", 9 pgs.

"U.S. Appl. No. 15/801,814, Response filed Apr. 10, 2019 to Non Final Office Action dated Feb. 19, 2019", 13 pgs.

"U.S. Appl. No. 15/801,814, Response filed Jul. 3, 2019 to Final Office Action dated May 30, 2019", 11 pgs.

Leyden, John, "This SMS will self-destruct in 40 seconds", [Online] Retrieved from the internet: <URL: http://www.theregister.co.uk/2005/12/12/stealthtext/>, (Dec. 12, 2005), 1 pg.

Wang, Hongcheng, et al., "Videoshop: A New Framework for Spatio-Temporal Video Editing in Gradient Domain", Graphical Models 69, Science Direct (Online) [Retrieved on Feb. 13, 2019], URL: https://www.sciencedirect.com/science/article/pii/S1524070306000439, (Aug. 21, 2006), 14 pgs.

* cited by examiner

MODIFYING MULTIPLE OBJECTS WITHIN A VIDEO STREAM

RELATED APPLICATIONS

This application is a continuation of U.S. application Ser. No. 15/801,814, filed Nov. 2, 2017, which claims the priority benefit of U.S. Provisional Application No. 62/419,869, entitled "MODIFYING MULTIPLE OBJECTS WITHIN A VIDEO STREAM," filed Nov. 9, 2016, each of which are hereby incorporated herein by reference in their entireties.

TECHNICAL FIELD

Embodiments of the present disclosure relate generally to automated identification of objects in a video stream and presentation of modified objects within the video stream. More particularly, but not by way of limitation, the present disclosure addresses systems and methods for identifying objects within images of a video stream, applying a scaled graphical representation to the object in the images, and presenting a rendering of the scaled graphical representation on the object within images of the video stream depicted within a user interface.

BACKGROUND

Telecommunications applications and devices can provide communication between multiple users using a variety of media, such as text, images, sound recordings, and/or video recordings. For example, video conferencing allows two or more individuals to communicate with each other using a combination of software applications, telecommunications devices, and a telecommunications network. Telecommunications devices may also record video streams to transmit as messages across a telecommunications network.

Although telecommunications applications and devices exist to provide two-way video communication between two devices, there can be issues with video streaming, such as modifying images within the video stream during pendency of a communication session. Telecommunications devices use physical manipulation of the device in order to perform operations. For example, devices are typically operated by changing an orientation of the device or manipulating an input device, such as a touchscreen. Accordingly, there is still a need in the art to improve video communications between devices and modifying video streams in real time while the video stream is being captured.

BRIEF DESCRIPTION OF THE DRAWINGS

Various ones of the appended drawings merely illustrate example embodiments of the present disclosure and should not be considered as limiting its scope.

Figure 1:
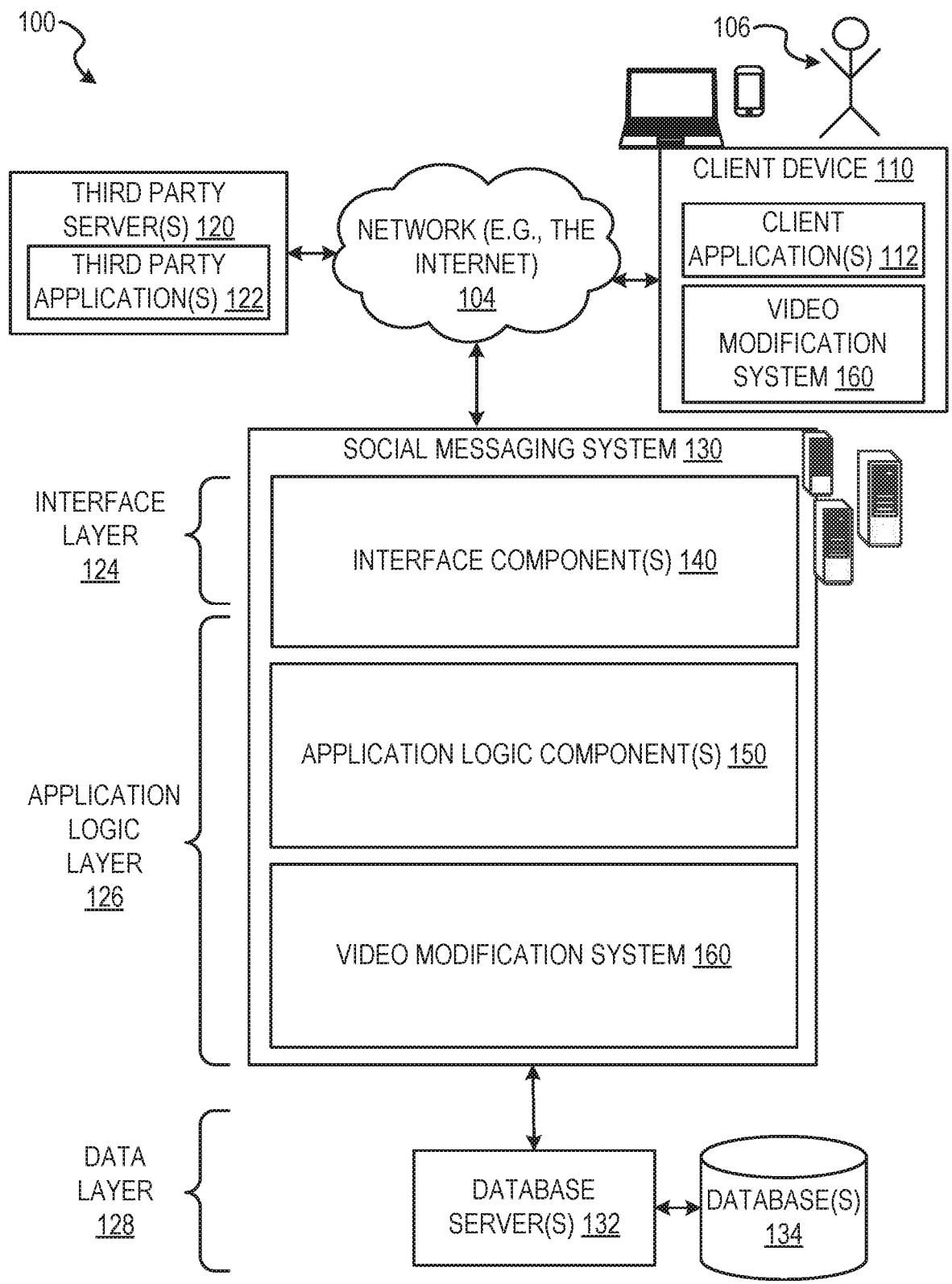
FIG. 1 is a block diagram illustrating a network system, according to some example embodiments.

The headings provided herein are merely for convenience and do not necessarily affect the scope or meaning of the terms used.

DETAILED DESCRIPTION

Embodiments of the present disclosure relate generally to automated identification of objects in a video stream and presentation of modified objects within the video stream. More particularly, but not by way of limitation, the present disclosure addresses systems and methods for identifying objects within images of a video stream, applying a scaled graphical representation to the object in the images, and presenting a rendering of the scaled graphical representation on the object within images of the video stream depicted within a user interface. The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In some example embodiments, a vending machine or kiosk is placed in a public shopping area (e.g., a mall). The vending machine includes a screen, a user interface displayed on the screen, and a camera. A user interacts with the user interface at the vending machine to select aspects of glasses (e.g., color, frame style, or size) she wants to virtually try on. When the user taps or holds a video capture icon in the user interface, the camera begins to capture a video stream. The user may select aspects of the glasses or initiate video capture in differing orders depending on the embodiment of the user interface.

Once capture of the video stream begins, processing components (e.g., hardware processors) of the vending machine analyze the video stream to identify the user's face, or at least a part of the user's face. The processing components determine characteristics of the face including two-dimensional coordinates for selected points on the face and a size or scale of the face. The processing components modify a three-dimensional model of a pair of glasses for the virtual try-on using the characteristics of the face. The processing components may modify the size of the three-dimensional glasses model to achieve a realistic fit for the glasses model to the face within the video stream. The processing components then apply the three-dimensional glasses model to the face by affixing the three-dimensional model to at least one of the two-dimensional coordinates.

Once the three-dimensional model has been applied, the processing components present a modified version of the video stream within the user interface of the vending machine. The modified version of the video stream includes the face and the three-dimensional glasses model positioned on the face. The three-dimensional model is depicted on the face as though the user were wearing a physical pair of the glasses. As the user moves her face and head, the processing components track the movement and move the three-dimensional glasses model in a corresponding manner. In some instances, the processing components, tracking movement of the face and three-dimensional glasses model, adjust visual aspects of the glasses model to mimic differing lighting conditions, angles, shapes, or shadows resulting from movement of the face and three-dimensional glasses model. As described below, the processing components of the vending machine analyze the face, scale and fit the three-dimensional glasses model, and present the modified video stream in real time as the video stream including the face is being simultaneously captured.

In some embodiments, the processing components perform face analysis and scaling and fitting of three-dimensional glasses models for multiple users simultaneously appearing in the video stream. For example, the processing components may detect two, three, ten, or more user faces in a video stream and apply three-dimensional glasses models to each user face. In some instances, each three-dimensional glasses model is tailored to selections of the specified user.

Although the present disclosure is described with respect to a vending machine or kiosk, it should be understood that processing components of the present disclosure may be included in a mobile computing device (e.g., smartphone, tablet, or laptop), a stationary computing device (e.g., a desktop computer, personal computer, vending machine, or kiosk), or any other suitable computing device in communication with an image capture device.

The various embodiments of the present disclosure relate to devices and instructions by one or more processors of a device to modify an image or a video stream captured by the device and presented thereon or transmitted by the device to another device while the video stream is being captured (e.g., modifying a video stream in real time). A video modification system is described that identifies and tracks objects and areas of interest within an image or across a video stream and through a set of images comprising the video stream. In various example embodiments, the video modification system identifies faces and fits various three-dimensional models (e.g., glasses, clothing, accessories, hairstyles, or devices) to the faces depicted within a field of view of an image capture device. In some instances, the video modification system generates and modifies visual elements within the video stream based on data captured from the real-world environment as captured within the video stream and an accompanying audio stream.

FIG. 1 is a network diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although the network system 100 is illustrated herein as having a client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of the instructions, as a special-purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as having a three-tiered architecture, the inventive subject matter is by no means limited to such an architecture.

As shown in FIG. 1, the interface layer 124 consists of interface components (e.g., a web server) 140, which receive requests from various client-computing devices and servers, such as client devices 110 executing client application(s) 112, and third-party servers 120 executing third-party application(s) 122. In response to the received requests, the interface components 140 communicate appropriate responses to requesting devices via a network 104. For example, the interface components 140 can receive requests such as Hypertext Transfer Protocol (HTTP) requests, or other web-based, Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client devices 110 form all or part of a video modification system 160 such that components of the video modification system 160 configure the client device 110 to perform a specific set of functions with respect to operations of the video modification system 160. Although described with respect to a mobile computing device, such as a smartphone, in some embodiments, the client device 110 is a display, a dispensing machine, a kiosk, a laptop, a tablet, a desktop or personal computer, or any other suitable computing device.

In an example, the client devices 110 are executing the client application(s) 112. The client application(s) 112 can provide functionality to present information to a user 106 and communicate via the network 104 to exchange information with the social messaging system 130. Further, in some examples, the client devices 110 execute functionality of the video modification system 160 to segment images of video streams during capture of the video streams and transmit the video streams (e.g., with image data modified based on the segmented images of the video stream).

Each of the client devices 110 can comprise a computing device that includes at least a display and communication capabilities with the network 104 to access the social messaging system 130, other client devices, and third-party servers 120. The client devices 110 comprise, but are not limited to, remote devices, workstations, computers, general-purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. The user 106 can be a person, a machine, or other means of interacting with the client devices 110. In some embodiments, the user 106 interacts with the social messaging system 130 via the client devices 110. The user 106 may not be part of the networked environment, but may be associated with the client devices 110.

As shown in FIG. 1, the data layer 128 has database servers 132 that facilitate access to information storage repositories or databases 134. The databases 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface components 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with one or more of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the video modification system 160 capable of identifying faces within a first set of images of a video stream and generating a model of a set of glasses affixed to the faces in real time in a second set of images of the video stream while the video stream is being captured. The video modification system 160 may additionally identify, track, and modify video data during capture of the video data by the client device 110. Similarly, the client device 110 includes a portion of the video modification system 160, as described above. In other examples, the client device 110 may include the entirety of the video modification system 160. In instances where the client device 110 includes a portion of (or all of) the video modification system 160, the client device 110 can work alone or in cooperation with the social messaging system 130 to provide the functionality of the video modification system 160 described herein.

In some embodiments, the social messaging system 130 may be an ephemeral message system that enables ephemeral communications where content (e.g., video clips or images) is deleted following a deletion trigger event such as a viewing time or viewing completion. In such embodiments, a device uses the various components described herein within the context of any of generating, sending, receiving, or displaying aspects of an ephemeral message. For example, a device implementing the video modification system 160 may identify, track, and modify an object of interest, such as pixels representing skin on a face, glasses positioned on a face, clothing articles positioned proximate to a face or on a body, or any other objects depicted in the video clip. The device may modify objects of interest during capture of the video clip without image processing after capture of the video clip as a part of a generation of content for an ephemeral message.

Figure 2:
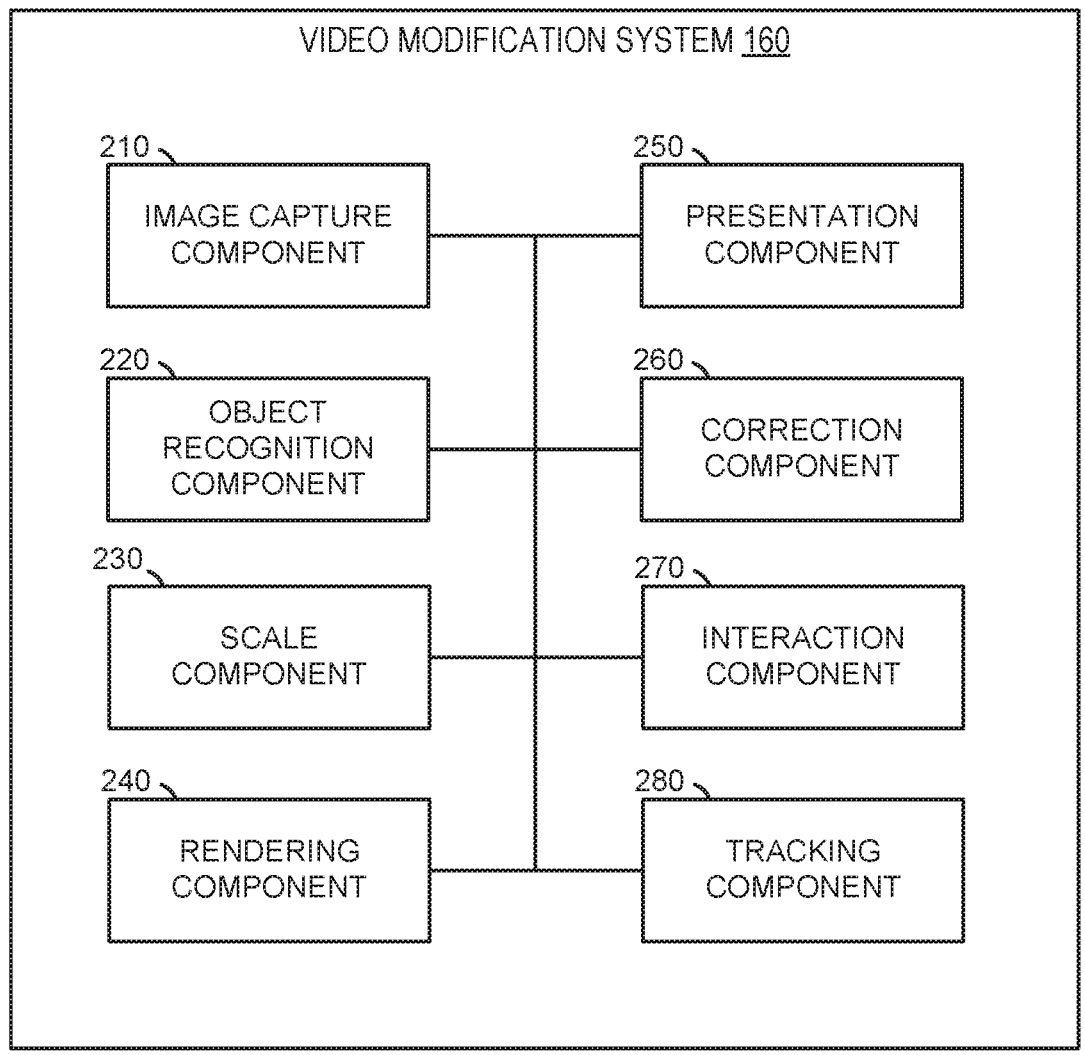
FIG. 2 is a diagram illustrating a video modification system, according to some example embodiments.

FIG. 2 is a diagram illustrating the video modification system 160, according to some example embodiments. In various embodiments, the video modification system 160 can be implemented as a standalone system or implemented in conjunction with the client device 110, and is not necessarily included in the social messaging system 130. The video modification system 160 is shown to include an image capture component 210, an object recognition component 220, a scale component 230, a rendering component 240, a presentation component 250, a correction component 260, an interaction component 270, and a tracking component 280. All, or some, of the components 210-280 communicate with each other, for example, via a network coupling, shared memory, and the like. Each component of the components 210-280 can be implemented as a single component, combined into other components, or further subdivided into multiple components. Other components not pertinent to example embodiments can also be included, but are not shown.

Figure 3:
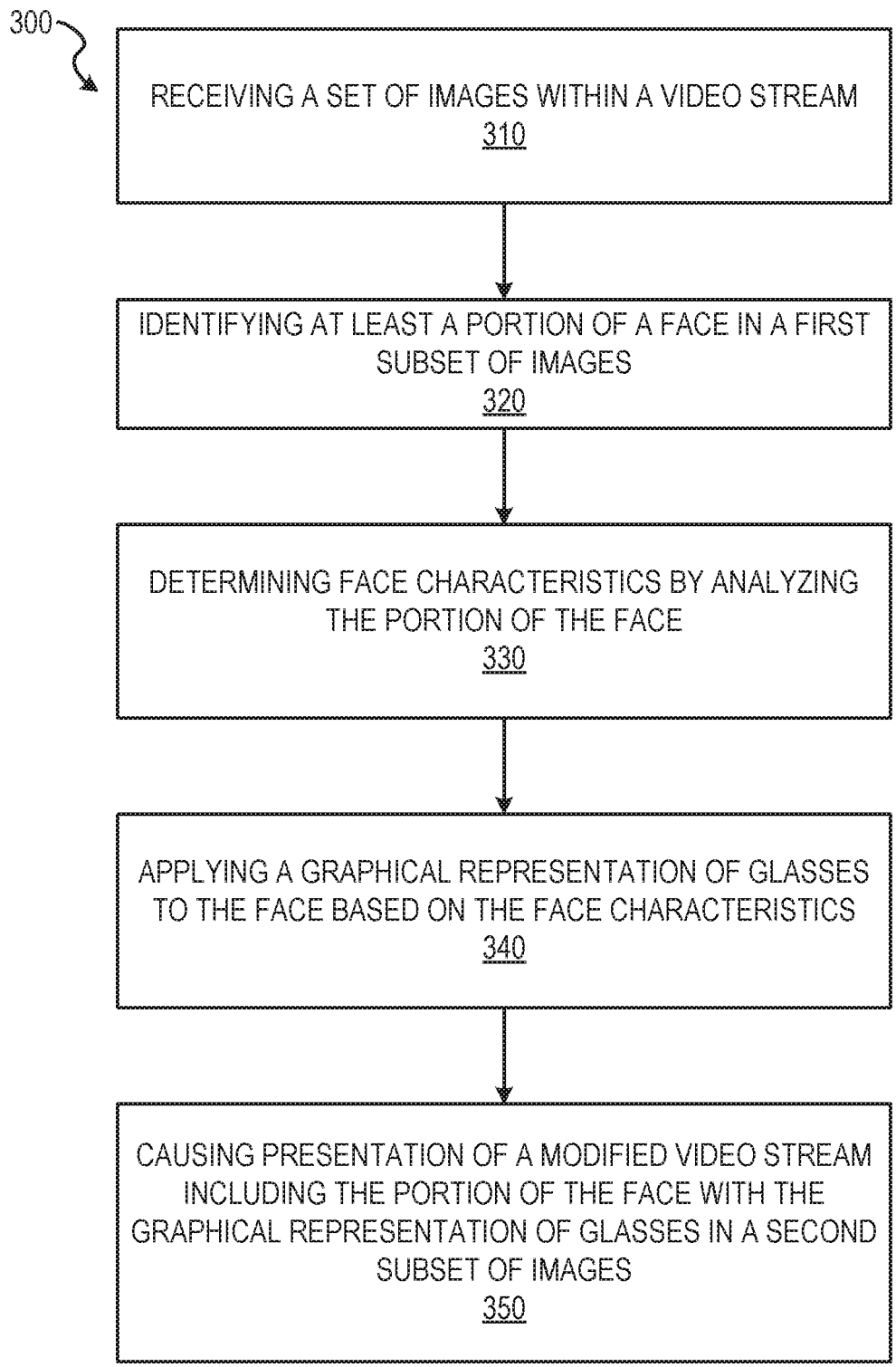
FIG. 3 is a flow diagram illustrating an example method for identifying a face and fitting graphical representations to the face, according to some example embodiments.

FIG. 3 depicts a flow diagram illustrating an example method 300 for identifying a face within a first set of images of a video stream and generating a graphical representation of a set of glasses affixed to the face in real time in a second set of images of the video stream while the video stream is being captured. The video modification system 160 may use information gathered from user interactions with a computing device, information sensed or received by the computing device independent of user interaction, aspects or depictions within a field of view presented at the computing device, and any other suitable information to identify, scale, and render the glasses on the face within the video stream as the video stream is being captured and presented at the computing device. The operations of the method 300 may be performed by components of the video modification system 160, and are so described for purposes of illustration.

In operation 310, the image capture component 210 receives a set of images within a video stream. The set of images may be represented by one or more images depicted within a field of view of an image capture device. In some instances, the image capture component 210 accesses the video stream captured by the image capture device associated with the client device 110 and presented on the client device 110 as a portion of hardware comprising the image capture component 210. In these embodiments, the image capture component 210 directly receives the video stream captured by the image capture device. In some instances, the image capture component 210 passes all or part of the video stream (e.g., the set of images comprising the video stream) to one or more other components of the video modification system 160, as described below in more detail. The set of images may depict at least a portion of an object of interest (e.g., a face).

In some embodiments, the image capture component 210 comprises an image capture device that is in communication with or a part of the client device 110. For example, the client device 110 may be a vending or other dispensing machine or kiosk positioned in a public commerce area (e.g., a mall) and fitted with one or more image capture devices positioned at one or more face levels. The image capture component 210 may be initiated upon user interaction with a user interface of the client device 110 (e.g., a mobile computing device, a kiosk, or a vending machine). Selection of a user interface element to begin a fitting session, initiate image capture, or perform another suitable action or set of actions may cause the image capture component 210 to start receiving the set of images within the video stream.

In operation 320, the object recognition component 220 identifies at least a portion of a face in a first subset of images of the set of images. The object recognition component 220 may perform one or more operations to identify objects within an image (e.g., a frame of the video stream). For example, the object recognition component 220 may perform one or more object recognition operations on the one or more images. In some embodiments, the object recognition component 220 includes facial tracking logic to identify all or a portion of a face within the one or more images and track landmarks of the face across the set of images of the video stream. In some instances, the object recognition component 220 includes logic for shape recognition, edge detection, or any other suitable object detection mechanism. The object of interest may also be determined by the object recognition component 220 to be an example of a predetermined object type, matching shapes, edges, or landmarks within a range to an object type of a set of predetermined object types.

Where the object recognition component 220 uses landmarks (e.g., facial feature landmarks), the object recognition component 220 may access a landmark library. For example, where the object recognition component 220 is to detect a portion of a face around the eyes, including eyebrows as the objects of interest, the object recognition component 220 may access a facial landmark library containing predetermined landmarks around the eyes depicted on a face. The object recognition component 220 may determine the existence and location of one or more of eyes, irises, eyebrows, a nose, and any other suitable facial features, facial landmarks, or other portions of the face depicted within the video stream by identifying a subset of the facial landmarks around an area of interest on the face. The landmarks may be identified by comparing colors within the one or more images or identifying one or more edges within the one or more images. For example, the object recognition component 220, when identifying an eyebrow, may determine a change between a skin color and a hair color (e.g., eyebrow hair color) depicted within the one or more images. The object recognition component 220 may further identify distinct portions forming a single object.

In some embodiments, the object recognition component 220 identifies objects of interest or portions of objects of interest using a multilayer object model. In some embodiments, the object recognition component 220 detects the portion of the object of interest using distinct detection layers for each image or for a set of bounding boxes (e.g., two or more bounding boxes) defined within one or more images of the set of images. For example, each detection layer may be associated with a single bounding box or portion of the set of bounding boxes. In some instances, the object recognition component 220 uses distinct detection layers for certain bounding boxes of the two or more bounding boxes. For example, each detection layer of the set of detection layers may be associated with a specified parameter, such that a detection layer performs detection operations on bounding boxes of the two or more bounding boxes which have the specified parameter. The detection layers may detect the object of interest or at least a portion of the object of interest within the bounding boxes using one or more object detection methods such as image segmentation, blob analysis, edge matching or edge detection, gradient matching, grayscale matching, or any other suitable object detection method. In some embodiments, the detection layers use one or more selected aspects of the object detection methods referenced above without employing all portions of a selected object detection method. Further, in some instances, the detection layers use operations similar in function or result to one or more of the object detection methods described above derived from or contained within a machine learned model. The machine learned model may be generated by one or more machine learning techniques described in the present disclosure, such as K Nearest Neighbor, Linear Regression, Logistic Regression, Neural Networking, convolutional neural networking, fully connected neural networking, or any other suitable machine learning techniques.

In operation 330, the scale component 230 determines face characteristics by analyzing the portion of the face in the first subset of images. In some instances, the scale component 230 cooperates with the object recognition component 220 to determine the face characteristics using one or more of the object detection processes, operations, or techniques described above. For example, the scale component 230, cooperating with the object recognition component 220, may determine a portion of the face characteristics using facial landmarks, object detection, or any other suitable method. In such instances, the portion of the face characteristics may be individual features depicted on the face within the set of images.

In some embodiments, the scale component 230 determines the face characteristics by performing one or more operations or sub-operations on the first subset of images of the video stream. In these embodiments, the scale component 230 generates a set of two-dimensional coordinates for the portion of the face depicted within the first subset of images of the video stream. A portion of the two-dimensional coordinates of the set of two-dimensional coordinates may correspond to facial landmark coordinates depicted at specified pixels (e.g., x and y coordinate locations on a display device or within an image). In some instances, to generate the set of two-dimensional coordinates, the scale component 230 determines one or more relative distances between a set of facial features depicted on the portion of the face depicted within the first subset of images of the video stream. The scale component 230 then generates an estimated face size for the portion of the face depicted within the first subset of images of the video stream. The scale component 230 determines a face scale for the portion of the face, based at least in part on the set of two-dimensional coordinates. The face scale may be a set of measurements, a single measurement, a single value (e.g., a composite value), or any other suitable representation of a scale.

In some instances, the scale component 230 determines one or more normalization values for the set of two-dimensional coordinates and the face scale. The one or more normalization values are determined based on an expected facial range for faces within video streams. In some embodiments, the expected facial range comprises a first limit and a second limit. The first limit represents an upper portion of the expected facial range. The second limit represents a lower portion of the expected facial range. The scale component 230 generates a set of normalized two-dimensional coordinates and a normalized face scale.

In embodiments where the expected facial range comprises the first limit and the second limit, the correction component 260 determines that the set of two-dimensional coordinates and the estimated face size correspond to a value within the second limit of the facial range (e.g., less than the second limit). The correction component 260 generates a set of correction values for the set of two-dimensional coordinates and the estimated face size. The correction component 260 generates a set of corrected two-dimensional coordinates and a corrected face size based on the set of two-dimensional coordinates, the estimated face size, and the set of correction values.

In some embodiments, one or more of the scale component 230 and the object recognition component 220 identify an obstruction (e.g., a pair of prescription glasses) on the portion of the face based on edge detection or any other object recognition technique. The object recognition component 220 and the scale component 230 may determine points corresponding to the obstruction to be tracked, replaced, or overlayed by a graphical representation.

In operation 340, the rendering component 240 applies a graphical representation of glasses to the face based on the face characteristics. The graphical representation of glasses is applied in a second subset of images occurring within the video stream as the video stream is being received. In some embodiments, in applying the graphical representation of the glasses, the rendering component 240 identifies one or more first attachment points within the set of two-dimensional coordinates. The rendering component 240 identifies one or more second attachment points within the graphical representation of the glasses. The rendering component 240 positions at least one second attachment point of the graphical representation of the glasses proximate to at least one first attachment point of the set of two-dimensional coordinates of the face or portion of the face.

In some embodiments, in applying the graphical representation of the glasses to the face, the rendering component 240 identifies one or more dimensions of the graphical representation of the glasses. The graphical representation of the glasses has a first size comprising the one or more dimensions. Based on the face characteristics, the rendering component 240 modifies the one or more dimensions to scale the graphical representation of the glasses to fit the portion of the face. In some embodiments, the scaling of the one or more dimensions is performed while maintaining a set of proportions of the graphical representation of the glasses.

In instances where the object recognition component 220 or the scale component 230 identifies an obstruction which is positioned on a portion of the face corresponding to the application of the graphical representation of the glasses, the rendering component 240 may apply one or more visual effects to remove, cover, or otherwise obscure the obstruction to prevent the obstruction from interfering with presentation or rendering of the graphical representation of the glasses. For example, where the obstruction is a pair of prescription glasses, the rendering component 240 may apply the graphical representation of the glasses over the existing prescription glasses. The rendering component 240 may also edit out the existing prescription glasses, or a portion thereof, prior to applying the graphical representation of the glasses to the portion of the face.

In operation 350, the presentation component 250 causes presentation of a modified video stream including the portion of the face with the graphical representation of the glasses in the second subset of images of the set of images while receiving the video stream, as shown in FIGS. 6-15. In some embodiments, the modified video stream is a processed version of the video stream received in operation 310. In these embodiments, the modified video stream is presented so long as the face is present within the second subset of images.

Although the method 300 is described with respect to a portion of a face, it should be understood that in some embodiments, the method 300 may identify a set of faces within the first subset of images of the set of images, the set of faces including a first face corresponding to the portion of the face described with respect to operation 320. In these embodiments, components of the video modification system 160 determine a set of face characteristics for the set of faces, each face having a distinct set of face characteristics. The determination of the set of face characteristics may be performed similarly to or the same as the manner described above with respect to operation 330. Components of the video modification system 160 apply a set of graphical representations of glasses to the set of faces. Each graphical representation of glasses corresponds to a single face to which the graphical representation of glasses is applied. In some embodiments, the object modification system 160 applies the set of graphical representations of glasses to the set of faces in a manner similar to or the same as the manner described above with respect to operation 340. Components of the video modification system 160 cause presentation of the modified video steam including the set of faces with the set of graphical representations of glasses in a second subset of images while receiving the video stream. In some embodiments, the video modification system 160 causes presentation of the set of faces and set of graphical representations of glasses in a manner similar to or the same as the manner described above with respect to operation 350.

Figure 4:
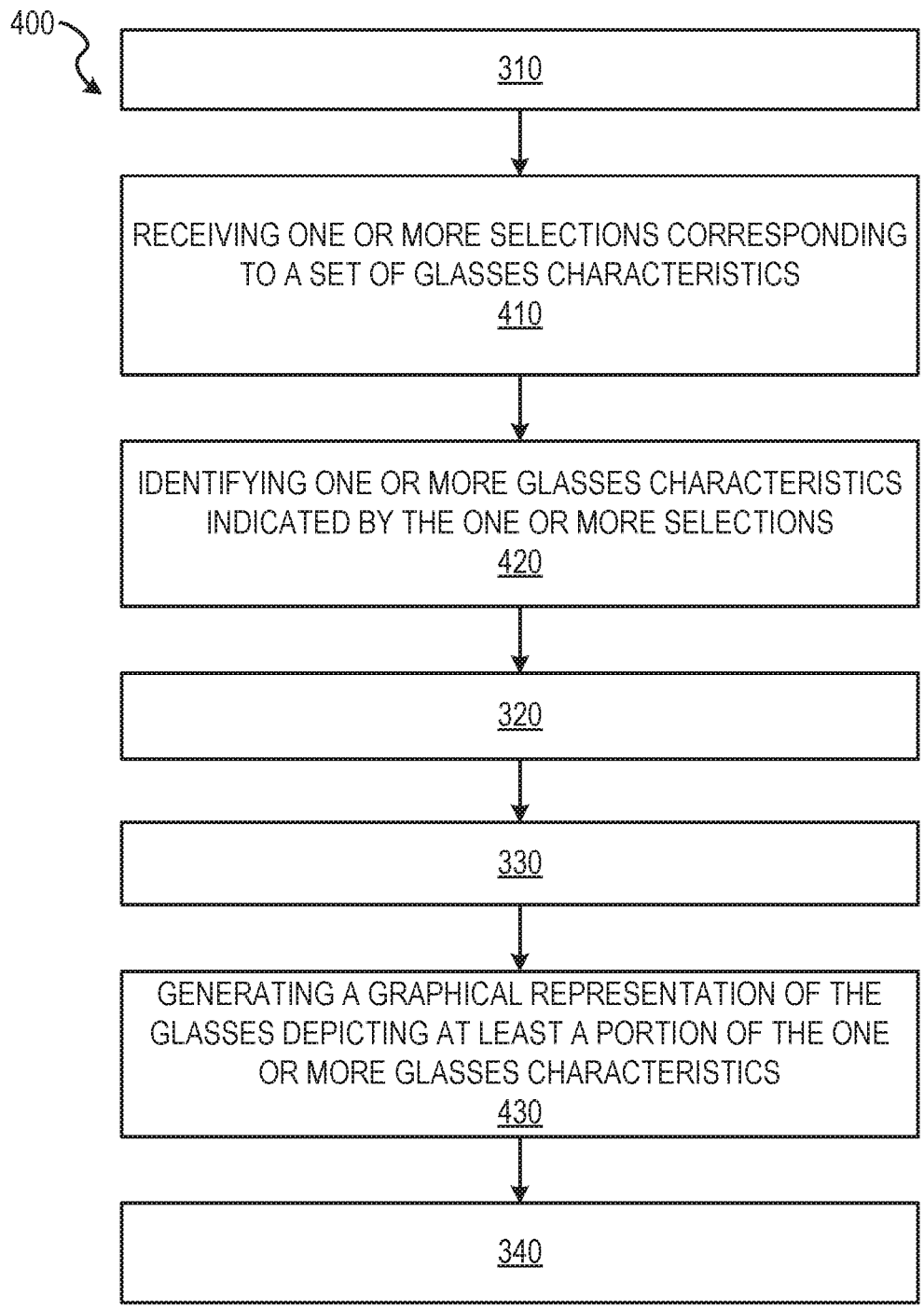
FIG. 4 is a flow diagram illustrating an example method for identifying a face and fitting graphical representations to the face, according to some example embodiments.

FIG. 4 depicts a flow diagram illustrating an example method 400 for generating a graphical representation of a set of glasses affixed to a face in real time in a set of images of a video stream while the video stream is capturing at least a portion of the face. The operations of the method 400 may be performed by components of the video modification system 160, and are so described for purposes of illustration. In some embodiments, operations of the method 400 incorporate one or more operations of the method 300, are performed as operations within the method 300, or are performed as sub-operations of one or more operations of the method 300.

In operation 410, the interaction component 270 receives one or more selections corresponding to a set of glasses characteristics of the graphical representation of the glasses. In some embodiments, the interaction component 270 operates in conjunction or cooperation with the presentation component 250 to cause presentation of a representation of the glasses and selectable options or characteristics of the glasses. In such embodiments, the presentation component 250 causes presentation of a set of user selectable elements. Each user selectable element of the set of user selectable elements represents a characteristic of the glasses. In some embodiments, the glasses comprise frames and lenses of a pair of glasses as well as at least one image capture device and associated components configured to enable operation of the at least one image capture device. In such embodiments, each user selectable element of the set of user selectable elements represents a characteristic of the glasses, the at least one image capture device, or the associated components of the at least one image capture device.

In some embodiments, the set of glasses characteristics comprises a set of styles, a set of colors, a set of sizes, a set of lens types, a set of frames, a set of bridges, a set of hinges, a set of temples, a set of earpieces, a set of screws, a set of nose pads, a set of top bars, a set of end pieces, a set of rims, a set of pad arms, combinations thereof, or any other suitable aspect, element, or part of a pair of glasses. In some instances, the set of glasses characteristics comprises the set of characteristics corresponding to the aspects, elements, and parts of a pair of glasses and further comprises a set of image capture devices, a number of image capture devices, a set of image capture lenses, a set of image capture rims, a set of image capture rim colors, a set of battery capacities, a set of storage capacities, combinations thereof, and any other suitable aspects, elements, parts, or features for image capture devices or mobile computing devices.

Although described with respect to selections, in some example embodiments, the interaction component 270 receives selections in the form of actions identified within the video stream. In such embodiments, the interaction component 270, in cooperation with one or more of the tracking component 280, the object recognition component 220, and the scale component 230, identifies one or more actions associated with a selection. For example, one or more of the tracking component 280, the object recognition component 220, and the scale component 230 may identify a change in eyebrow position, a change in mouth position (e.g., open or closed), a change in eye position (e.g., open, closed, a blink, or a temporary closure), a voice command, or any other suitable, detectable change in depiction or position of the face or change in audio levels. The identified change may correspond to a selection of a characteristic of the graphical representation of the glasses. In some embodiments, a specified change of a characteristic or aspect of the face or audio levels corresponds to a specified glasses characteristic. For example, a change of an eyebrow position may correspond to a change in glasses color, a change in a mouth position may correspond to a change in a frame style, and a change in eye position (e.g., a blink or temporary closure for a predetermined period of time) may correspond to a change in a lens color or style.

In some instances, a change of a characteristic or aspect of the face or audio levels corresponds to a selection indicating a desire to cycle through or iterate one or more glasses characteristics. For example, the set of glasses characteristics selectable through the interaction component 270 may be organized into a list or an ordered list. Each identified change in the face or audio level may cause the interaction component 270 or the rendering component 240 to step or progressively cycle through the set of glasses characteristics. In such instances, each time the interaction component 270 receives an indication of a change in mouth position (e.g., a discrete opening and closing of the mouth), the interaction component 270 or the rendering component 240 may select and render a subsequent glasses characteristic of the set of glasses characteristics on the graphical representation of the glasses.

In some example embodiments, receiving a selection (e.g., an indication of a change in a characteristic of a face or audio level) causes an iterative change in a single glasses characteristic. The iterative change may reflect a change between an on position and an off position, changes between two opposing characteristics (e.g., colors or styles), or any other suitable iteration between a subset of glasses characteristics. For example, receiving a selection corresponding to a first change in eyebrow position may cause one or more of the interaction component 270 and the rendering component 240 to generate and present a red light, indicating image capture device recording, and receiving a subsequent selection corresponding to a second change in eyebrow position may cause the red light to be removed from the graphical representation of the glasses. In such examples, the red light may be positioned proximate to an image capture device depicted as part of the graphical representation of the glasses.

In operation 420, the interaction component 270 identifies one or more glasses characteristics from the set of glasses characteristics indicated by the one or more selections. In some embodiments, the one or more glasses characteristics comprise one or more characteristics of the glasses, one or more characteristics of an image capture device, and one or more characteristics of associated components for the image capture device. In some embodiments, the interaction component 270 identifies the user selectable elements selected in operation 410 and identifies the characteristics of glasses, image capture device, or associated components corresponding to the selected elements.

In operation 430, the rendering component 240 generates the graphical representation of the glasses depicting at least a portion of the one or more glasses characteristics, as shown in FIGS. 6-15. In some embodiments, the graphical representation of the glasses is initially rendered as a three-dimensional model of a pair of glasses. For example, in FIG. 6, a three-dimensional model 600 of a pair of glasses is rendered on a user 602. The rendering component 240 receives indications of the one or more glasses characteristics from the interaction component 270. Upon receiving the indications, the rendering component 240 applies the one or more glasses characteristics to the three-dimensional model of the pair of glasses. In some instances, a characteristic identified in operation 420 is a characteristic which is not visible during typical wear of the pair of glasses. In such instances, the rendering component 240 precludes rendering of the non-visible characteristic onto the three-dimensional model.

Figure 5:
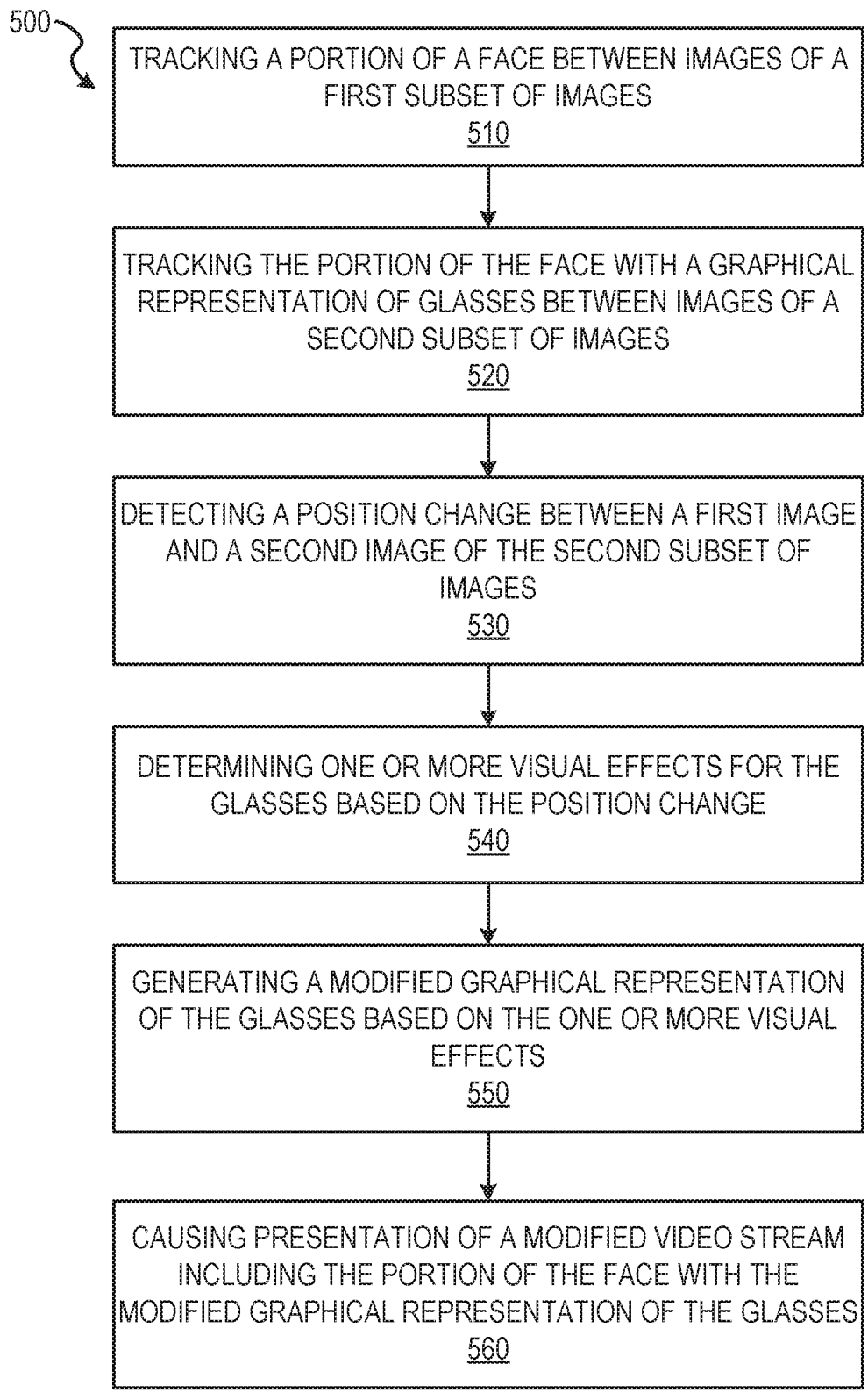
FIG. 5 is a flow diagram illustrating an example method for identifying a face and fitting graphical representations to the face, according to some example embodiments.
Figure 6:
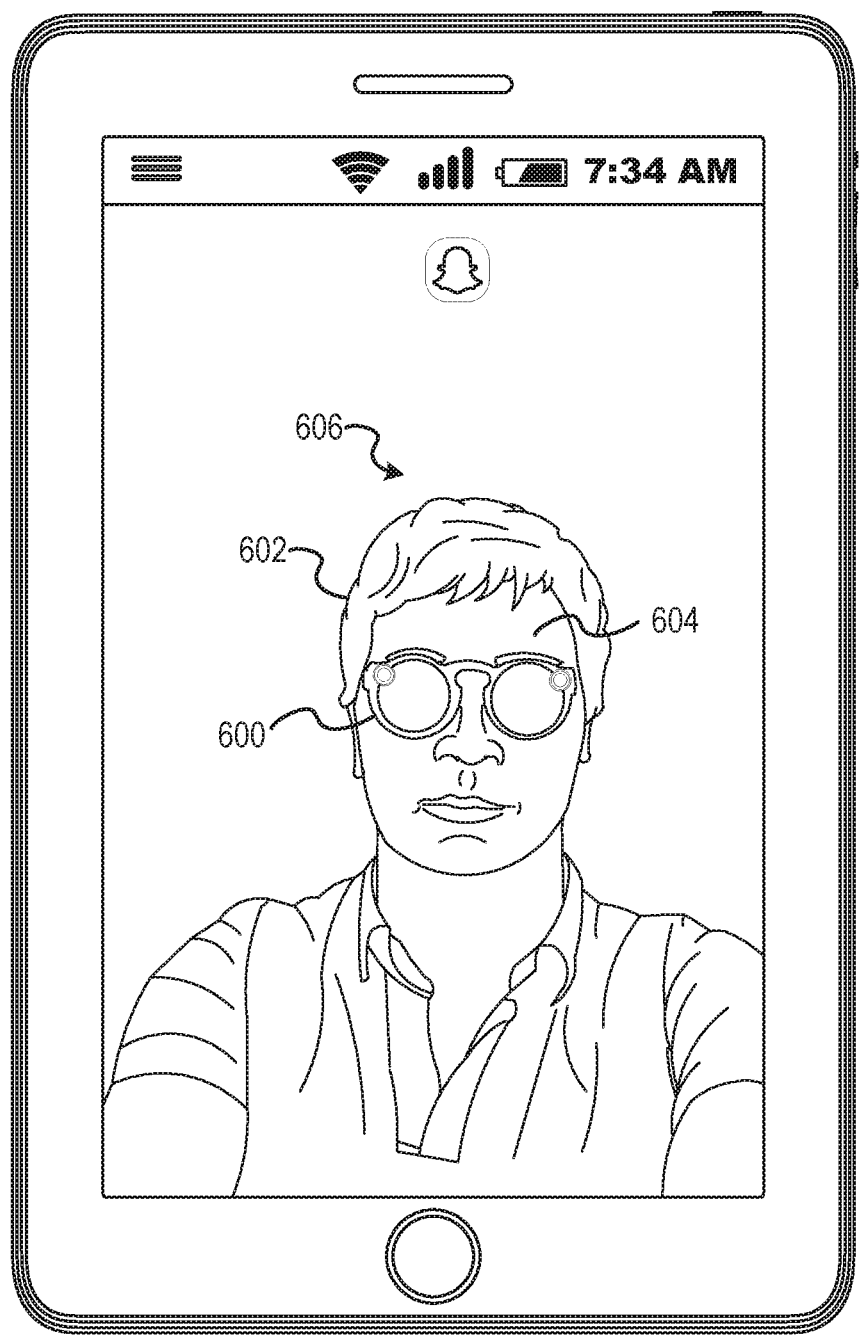
FIG. 6 is a user interface diagram depicting the video modification system in operation, according to some example embodiments.

FIG. 5 depicts a flow diagram illustrating an example method 500 for identifying and tracking a face within a first set of images of a video stream and generating a graphical representation of a set of glasses affixed to the face in real time in a second set of images of the video stream while the video stream is being captured. The operations of the method 500 may be performed by components of the video modification system 160, and are so described for purposes of illustration. In some embodiments, operations of the method 500 incorporate one or more operations of the methods 300 or 400, are performed as operations within the methods 300 or 400, or are performed as sub-operations of one or more operations of the methods 300 or 400.

In operation 510, the tracking component 280 tracks the portion of the face between an image and one or more subsequent images of the first subset of images. In some embodiments, tracking of the portion of the face is performed in response to the object recognition component 220 identifying the portion of the face in the image of the first subset of images. In some instances, the portion of the face is tracked between images by identifying positions of one or more facial tracking points, one or more facial features, or one or more two-dimensional coordinates associated with the face in the first image. The tracking component 280 then detects a position for each identified position of the aspects of the face being tracked in the subsequent frame. In some embodiments, the tracking component 280 smooths tracking of the face by using positions for two or more images of the set of images to track the positions in subsequent images.

Figure 7:
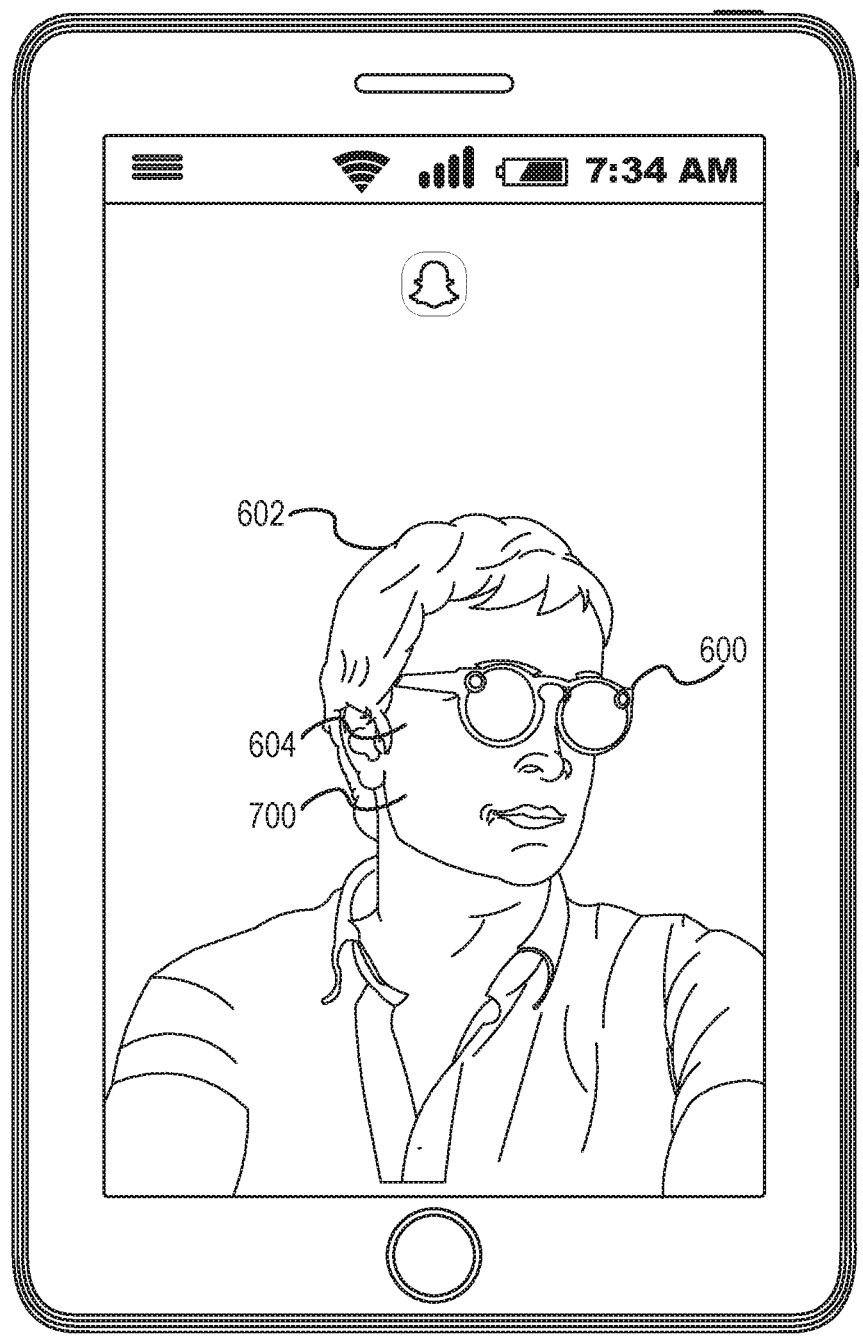
FIG. 7 is a user interface diagram depicting the video modification system in operation, according to some example embodiments.
Figure 8:
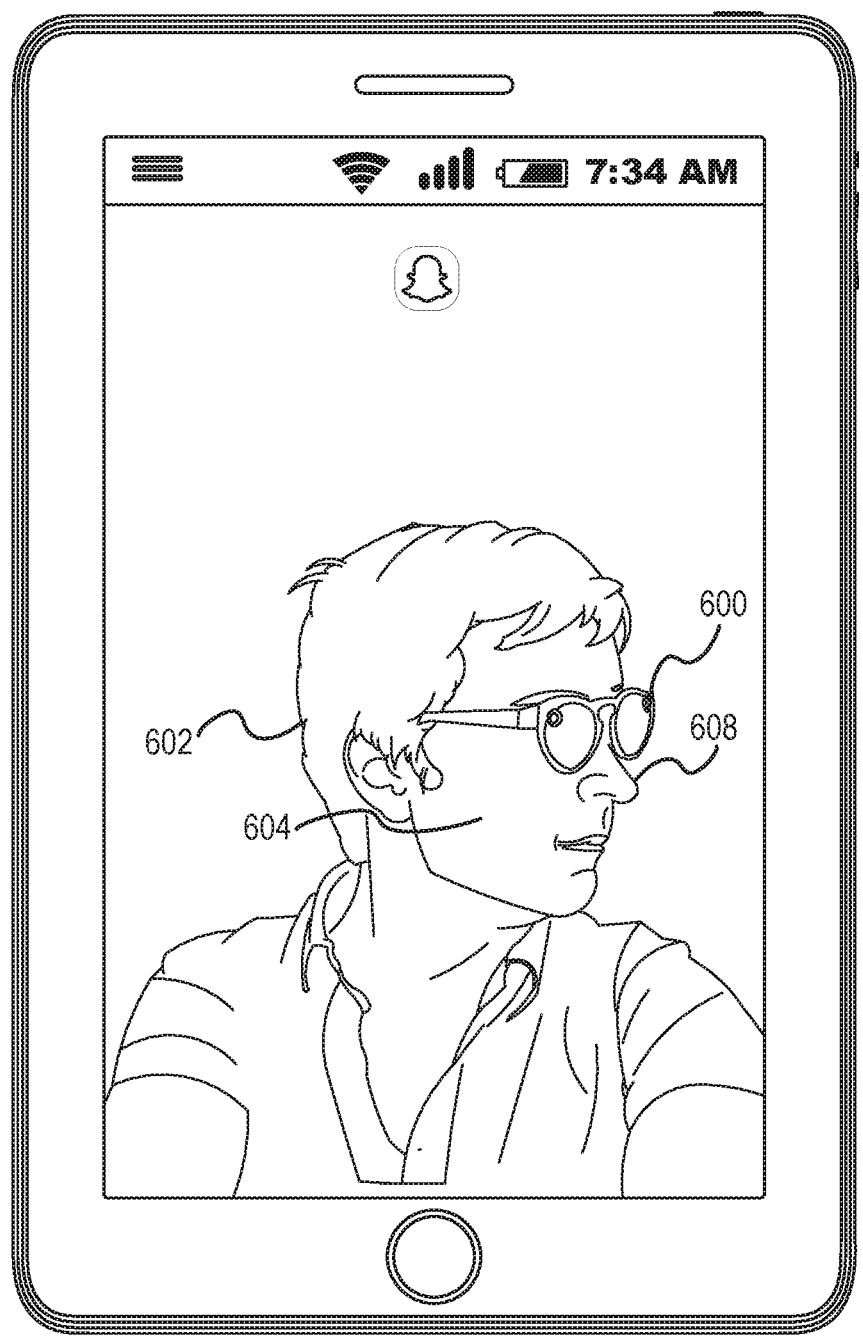
FIG. 8 is a user interface diagram depicting the video modification system in operation, according to some example embodiments.
Figure 9:
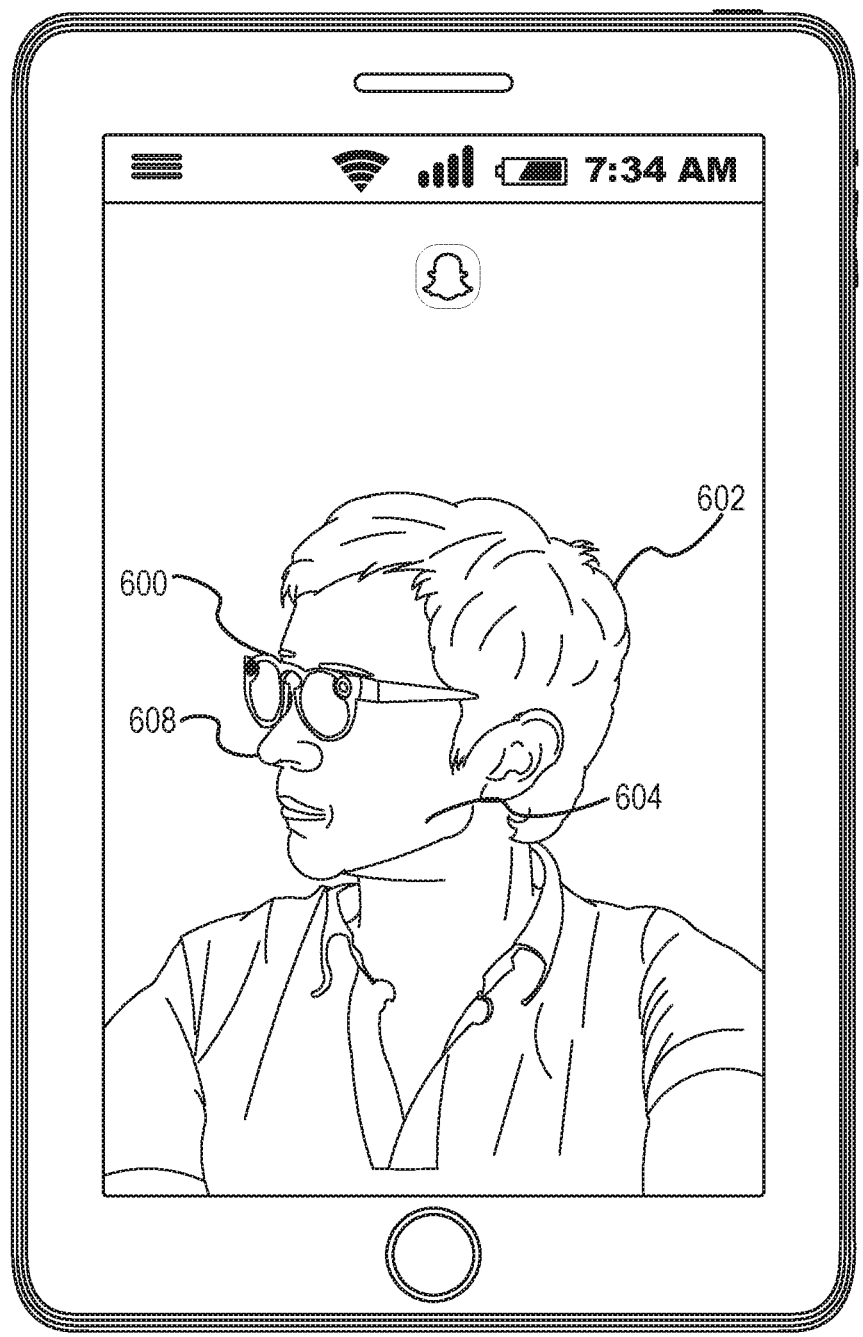
FIG. 9 is a user interface diagram depicting the video modification system in operation, according to some example embodiments.
Figure 10:
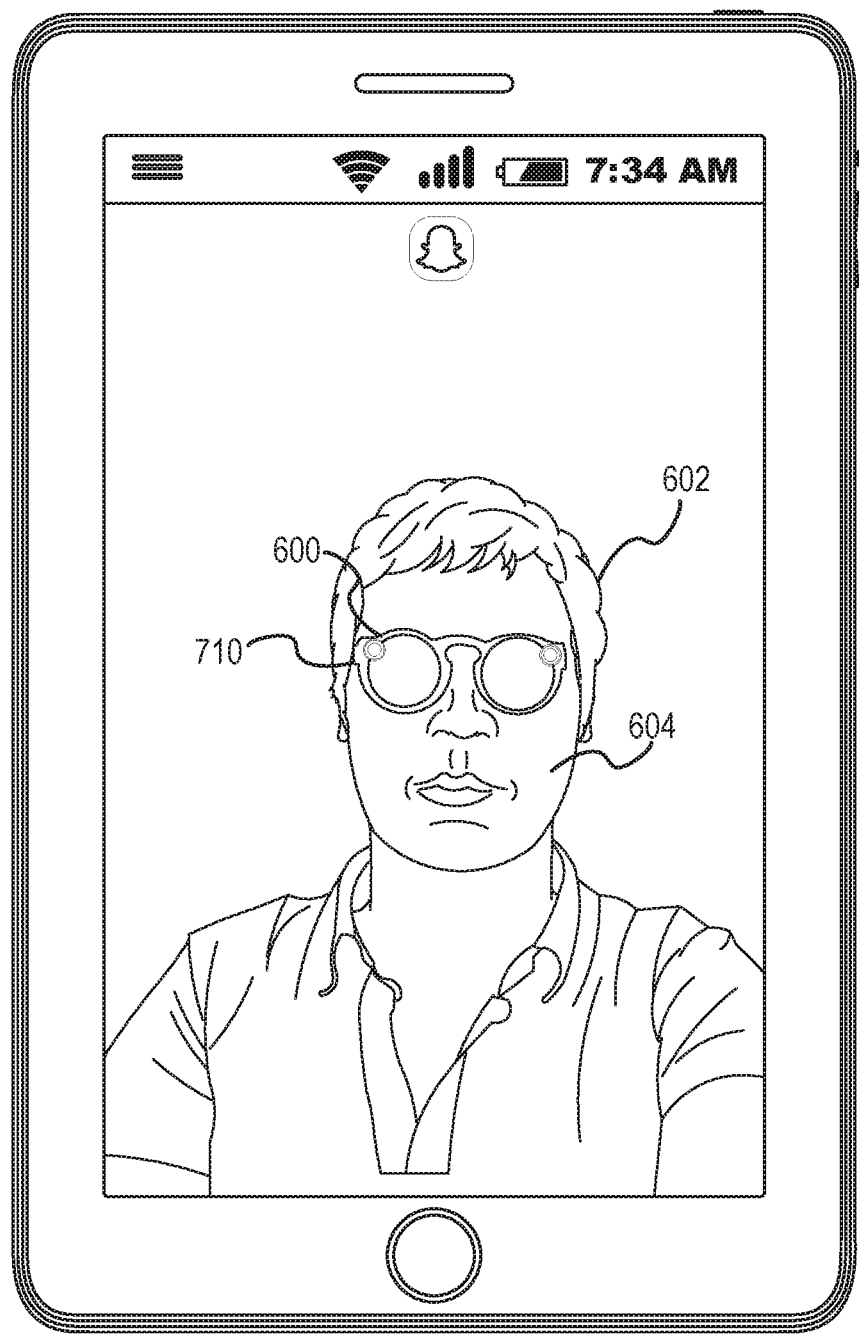
FIG. 10 is a user interface diagram depicting the video modification system in operation, according to some example embodiments.

In operation 520, the tracking component 280 tracks the portion of the face with the graphical representation of the glasses between one or more images of the second subset of images, in response to the rendering component 240 applying the graphical representation of the glasses to the portion of the face. As shown in FIGS. 6-15, the tracking component 280 tracks movement of the portion of a face 604 of the user 602 and the graphical representation of the glasses (e.g., the model 600) across multiple images of the second subset of images. For example, as the face 604 moves from a first position 606, in FIG. 6, to a second position 608, in FIG. 8 or FIG. 9, the tracking component 280 may track movement of the face 604, and one or more of the tracking component 280 and the rendering component 240 cause presentation of the model 600 at angles, orientations, or positions, corresponding to the face 604 and the first position 606, the second position 608, or an intermediate position 700, as shown in FIG. 7. Similar to the lateral position changes depicted in FIGS. 6-9, vertical positions may be tracked, as shown in FIGS. 10-14. Further, changes in distance may be tracked as shown in a position change between FIGS. 10 and 15. In some embodiments, the tracking component 280 tracks the portion of the face with an affixed glasses representation by identifying points on the face and the affixed glasses representation (e.g., facial landmarks, glasses landmarks, facial features, glasses features, or one or more points of the two-dimensional coordinates) in a first image or a first set of images (e.g., two or more images of the video stream). The tracking component 280 then tracks the identified points in one or more subsequent images by determining locations of the points within the subsequent images.

In some embodiments, to prevent shake or trembling of the affixed glasses representation, the tracking component 280 uses a combination of two or more previous locations for points associated with the glasses representation. In some instances, the tracking component 280 prevents shake or trembling of the affixed glasses representation by using a combination of shapes depicted for the glasses representation in previous images of the set of images. In some embodiments, the shapes are parts, features, or characteristics of the face. The tracking component 280 may also or alternatively use one or more position filtering methods to increase stability of the application of the glasses representation on the portion of the face. In some instances, position filtering comprises generating one or more position averages for previous images of the video stream to adjust position values for the glasses representation in subsequent images. In some embodiments, position filtering comprises one or more motion blur algorithms, operations, or functions. In such embodiments, the tracking component 280, alone or in cooperation with the rendering component 240, selectively applies motion blur algorithms to portions of the glasses representation. Further, in some of the embodiments, the tracking component 280 and the rendering component 240 selectively apply an amount of blur determined by the motion blur algorithms to differing portions of the glasses representation.

In some embodiments, operation 520 is performed using one or more operations or sub-operations. The tracking component 280 may determine a pixel depth of one or more pixels representing the portion of the face. In some instances, the tracking component 280 determines that the pixel depth exceeds a dynamically generated depth value. As shown in FIGS. 11-14, the rendering component 240 removes a portion of the graphical representation of the glasses from the presentation of the modified video stream, based on the determination of the pixel depth exceeding the dynamically generated depth value. In some embodiments, the portion of the graphical representation of the glasses is proximate to the one or more pixels for which the pixel depth is determined. In FIGS. 11-14, portions of temples or ear pieces 710 are removed based on pixel depths of one or more pixels of the face and one or more pixels of the graphical representation of the glasses. As shown in FIGS. 11-14, in some embodiments, a length of the temples 710 may be modified. Similarly, angles of the temples 710 relative to a frame 712 of the model 600 may be modified based on one or more of a position of the face 604, an orientation of the face 604, a distance of the face 604, or any other suitable discernable element.

In operation 530, the tracking component 280 detects a position change between a first image and a second image of the second subset of images. For example, as shown in FIGS. 10-14, the tracking component 280 may detect a position change of the portion of the face indicating rotation of the face in an upward or a downward direction with respect to an orientation of the client device 110 or the user interface. In some embodiments, the tracking component 280 detects the position change in a manner similar to or the same as described above with respect to operation 520. The position change may be detected for points on the face or points on the glasses representation.

In operation 540, the rendering component 240 determines one or more visual effects for the graphical representation of the glasses based on the position change. The visual effects may be associated with characteristics selected for the glasses representation. In some embodiments, the visual effects comprise one or more of a lighting source, a lighting intensity, a shadow, a color, a reflection, a glare, a glint, a lens flare, or any other suitable visual effect. In some instances, the visual effects represent changes to a visual depiction of the glasses based on changes in movement which could be viewed when wearing a physical pair of glasses and changing positions of one or more of the face or the glasses during the course of wear.

Figure 11:
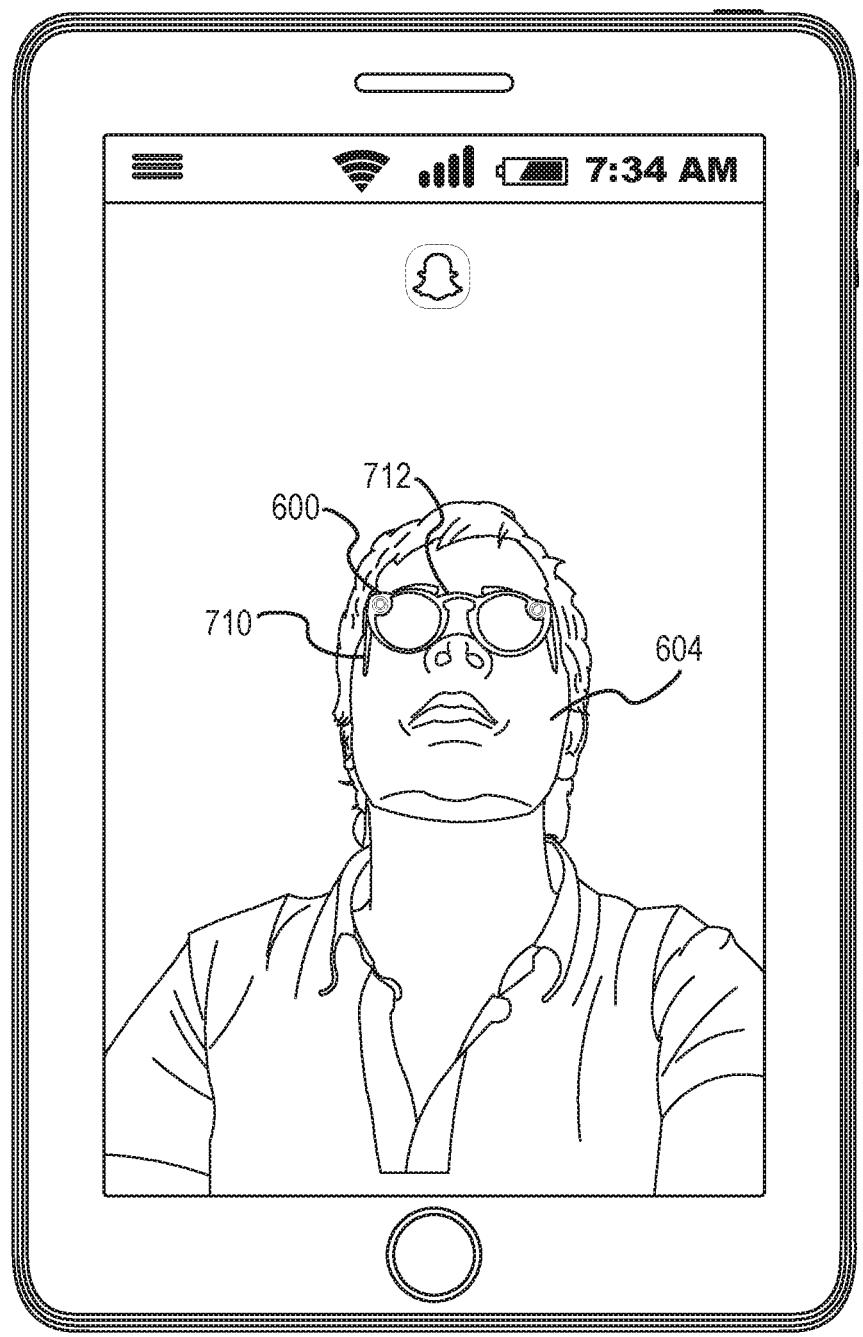
FIG. 11 is a user interface diagram depicting the video modification system in operation, according to some example embodiments.
Figure 12:
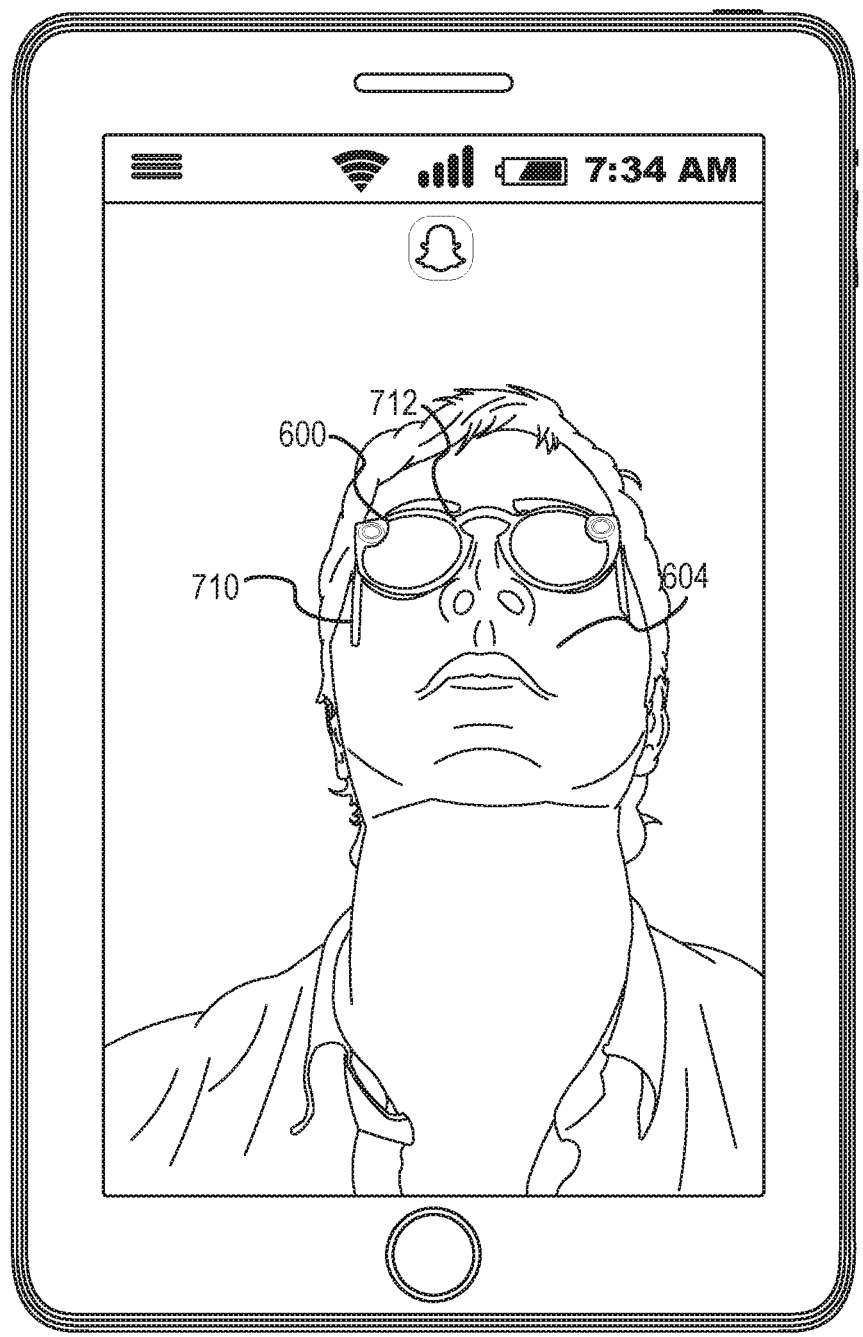
FIG. 12 is a user interface diagram depicting the video modification system in operation, according to some example embodiments.
Figure 13:
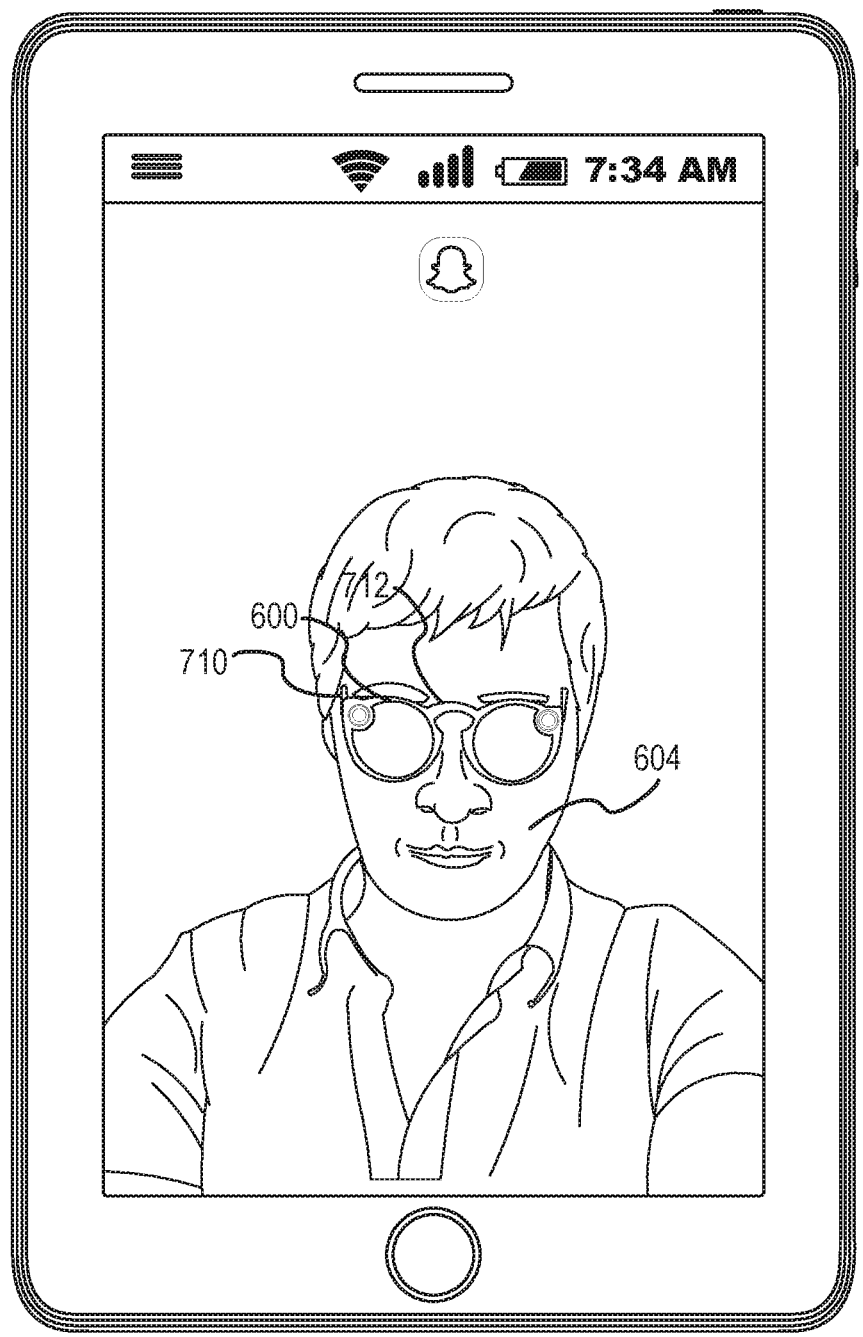
FIG. 13 is a user interface diagram depicting the video modification system in operation, according to some example embodiments.
Figure 14:
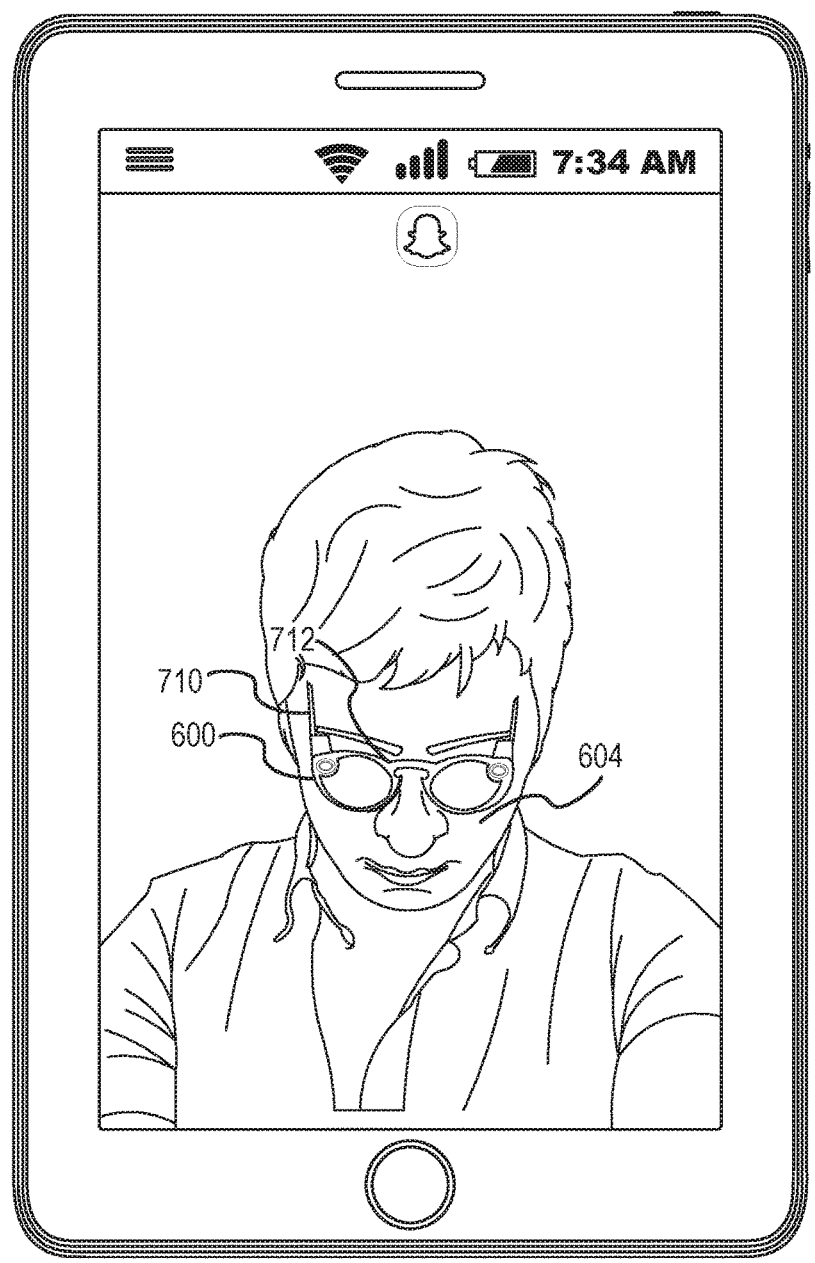
FIG. 14 is a user interface diagram depicting the video modification system in operation, according to some example embodiments.
Figure 15:
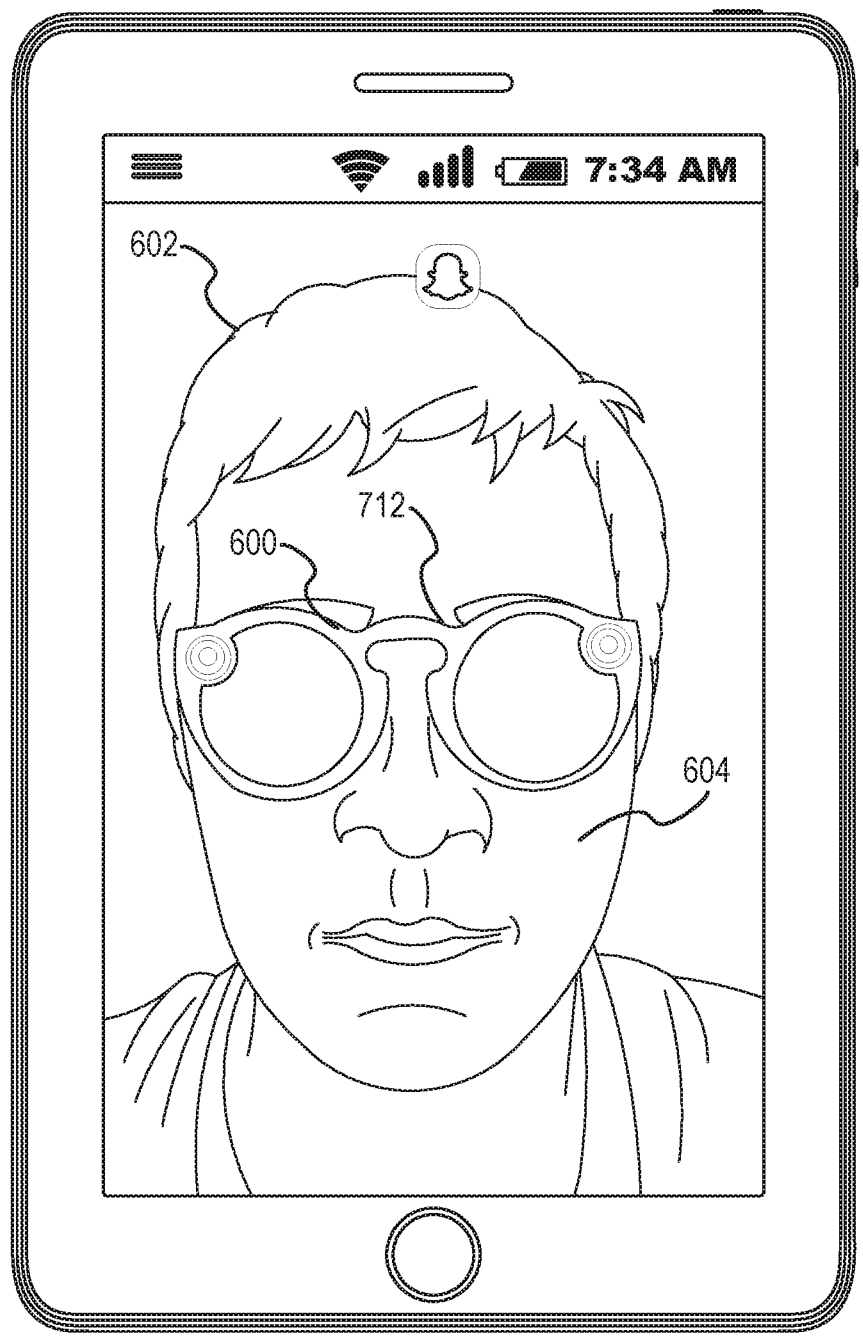
FIG. 15 is a user interface diagram depicting the video modification system in operation, according to some example embodiments.

In operation 550, the rendering component 240 generates a modified graphical representation of the glasses based on the one or more visual effects and an initial characteristic of the graphical representation of the glasses. The rendering component 240 applies the visual effects to the glasses representation in real time while the video stream is being captured. In FIGS. 11 and 12, variations may be applied to lighting or color values on the frames to mimic directing a portion of the graphical representation of the glasses toward a light source. In some instances, the rendering component 240 generates the modified graphical representation by modifying one or more color values, saturation values, hue values, dimensions of the glasses, shapes of portions of the glasses, reflections depicted within the lenses, or any other suitable elements modeling or reflecting real-world visual aspects changed by changing positions while wearing glasses.

In operation 560, the presentation component 250 causes presentation of the modified video stream including the portion of the face with the modified graphical representation of the glasses in a second subset of images of the set of images while receiving the video stream. In some embodiments, the presentation component 250 causes presentation of the modified video stream in a manner similar to or the same as the manner described above with respect to operation 350.

In some example embodiments, as described above, the client device 110, cooperating with or performing operations of the video modification system 160, is a product distribution machine (e.g., vending machine or kiosk). In these embodiments, the product distribution machine comprises an image capture device, a set of product distribution components, a display device, and at least a portion of the video modification system 160. In such embodiments, the product distribution machine may further comprise a product container and a supply or set of one or more products for distribution by the product distribution machine. The product distribution machine may be a standalone device, such as a kiosk, vending machine, or other suitable machine. The product distribution machine may also be part of a distributed product distribution system, such that orders logged or entered at the product distribution machine are transmitted to a shipping system configured to source and ship selected products corresponding to logged orders and physical addresses associated with the logged orders.

In some embodiments, the image capture device of the product distribution machine is a camera, a still camera, a digital camera, a video camera, a digital video camera, a high-definition camera, a scanner, a digital image sensor (e.g., a CCD sensor or a CMOS sensor), or any other suitable device or combination of components capable of capturing the set of images of the video stream. Example embodiments of the image capture device are described above.

The set of product distribution components comprises one or more components configured to transfer a product to a user of the product distribution machine. In some embodiments, the product distribution components comprise one or more of a conveyor belt mechanism, a claw mechanism, a screw mechanism, or any other suitable physical set of components capable of transferring a selected product from a product storage compartment or product display compartment to a product retrieval area (e.g., a bin, slot, or take-out port). In such embodiments, the product distribution components receive a specified product order, retrieve a product within the product distribution machine, and release or otherwise transfer the product to the user after completion of the product order.

In some instances, the product distribution components comprise one or more of a set of telecommunication components configured to enable communication between the product distribution machine and a shipping system or shipping center. In such embodiments, the product distribution machine receives selections of specified products or orders; transmits user information, order information (e.g., time, date, product identification, and product quantity), and location information (e.g., shipping address) to the shipping system or shipping center; and initiates a shipping process or causes the shipping system to select, package, and ship the specified product.

As described above and below in one or more embodiments, the display device comprises one or more of a screen, a touch screen, an audio device, or any other suitable devices capable of displaying and configured to display modified video streams generated by the client device 110 and the video modification system 160. The video modification system 160 may be implemented as part of the product distribution machine, in whole or in part on computing components of the product distribution machine, or in any other suitable manner such that the product distribution machine performs at least a portion of the functions described with respect to embodiments of the present disclosure. In some embodiments, the product distribution machine, having all or a portion of the video modification system 160 implemented therein, performs one or more of the methods 300, 400, and 500, combinations thereof, and any one or more portions of the embodiments described herein.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) are configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a field-programmable gate array (FPGA) or an application-specific integrated circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an API).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 16:
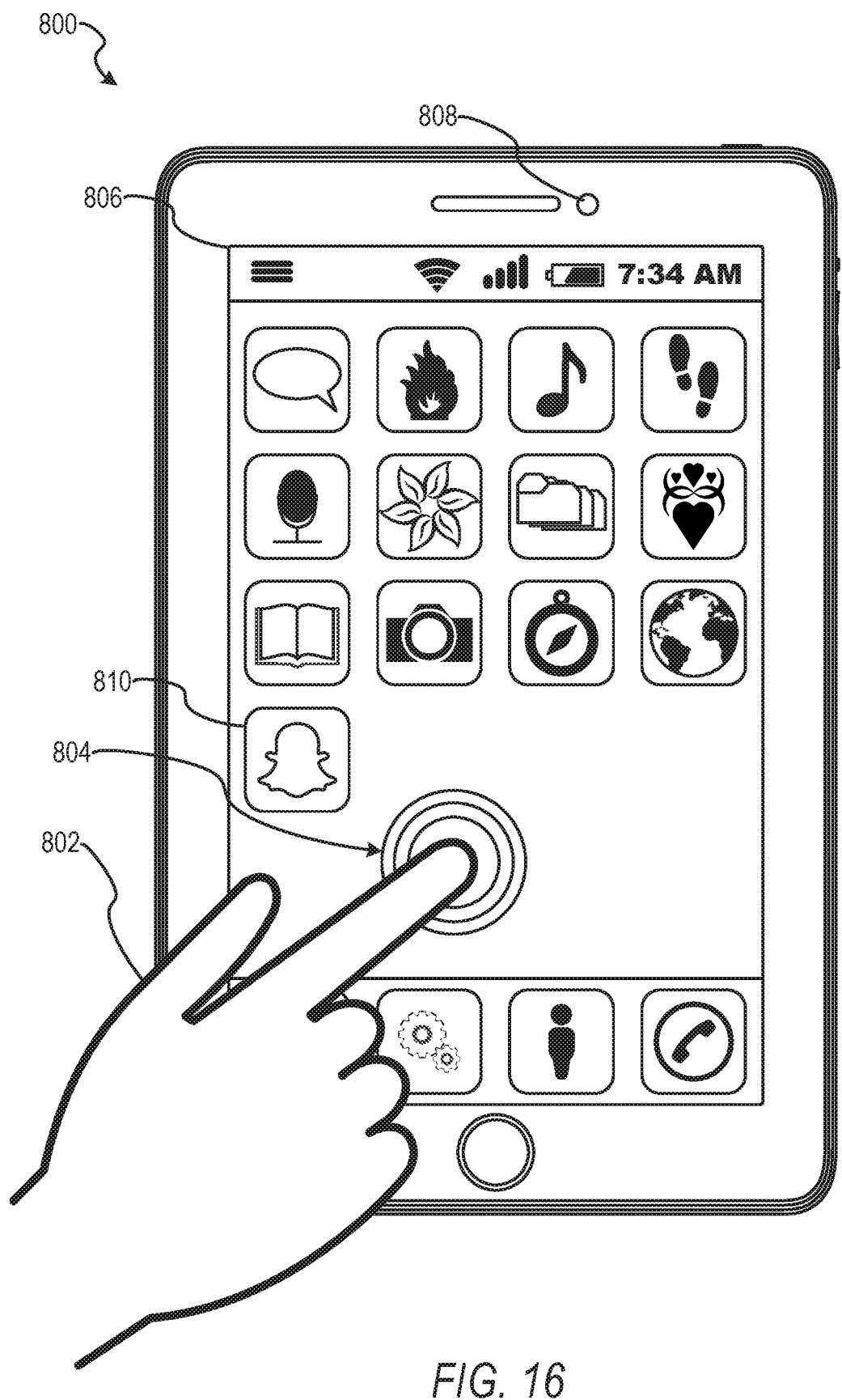
FIG. 16 is a user interface diagram depicting an example mobile device and mobile operating system interface, according to some example embodiments.

FIG. 16 illustrates an example mobile device 800 executing a mobile operating system (e.g., IOS™, ANDROID™, WINDOWS® Phone, or other mobile operating systems), consistent with some embodiments. In one embodiment, the mobile device 800 includes a touch screen operable to receive tactile data from a user 802. For instance, the user 802 may physically touch 804 the mobile device 800, and in response to the touch 804, the mobile device 800 may determine tactile data such as touch location, touch force, or gesture motion. In various example embodiments, the mobile device 800 displays a home screen 806 (e.g., Springboard on IOS™) operable to launch applications or otherwise manage various aspects of the mobile device 800. In some example embodiments, the home screen 806 provides status information such as battery life, connectivity, or other hardware statuses. The user 802 can activate user interface elements by touching an area occupied by a respective user interface element. In this manner, the user 802 interacts with the applications of the mobile device 800. For example, touching the area occupied by a particular icon included in the home screen 806 causes launching of an application corresponding to the particular icon.

The mobile device 800, as shown in FIG. 16, includes an imaging device 808. The imaging device 808 may be a camera or any other device coupled to the mobile device 800 capable of capturing a video stream or one or more successive images. The imaging device 808 may be triggered by the video modification system 160 or a selectable user interface element to initiate capture of a video stream or succession of images and pass the video stream or succession of images to the video modification system 160 for processing according to the one or more methods described in the present disclosure.

Many varieties of applications (also referred to as "apps") can be executing on the mobile device 800, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 800 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 800 includes a social messaging app 810 such as SNAPCHAT® that, consistent with some embodiments, allows users to exchange ephemeral messages that include media content. In this example, the social messaging app 810 can incorporate aspects of embodiments described herein. For example, in some embodiments, the social messaging app 810 includes an ephemeral gallery of media created by users the social messaging app 810. These galleries may consist of videos or pictures posted by a user and made viewable by contacts (e.g., "friends") of the user. Alternatively, public galleries may be created by administrators of the social messaging app 810 consisting of media from any users of the application (and accessible by all users). In yet another embodiment, the social messaging app 810 may include a "magazine" feature which consists of articles and other content generated by publishers on the social messaging application's platform and accessible by any users. Any of these environments or platforms may be used to implement concepts of the present disclosure.

In some embodiments, an ephemeral message system may include messages having ephemeral video clips or images which are deleted following a deletion trigger event such as a viewing time or viewing completion. In such embodiments, a device implementing the video modification system 160 may identify, track, extract, and generate representations of a face within the ephemeral video clip, as the ephemeral video clip is being captured by the device, and transmit the ephemeral video clip to another device using the ephemeral message system.

Software Architecture

Figure 17:
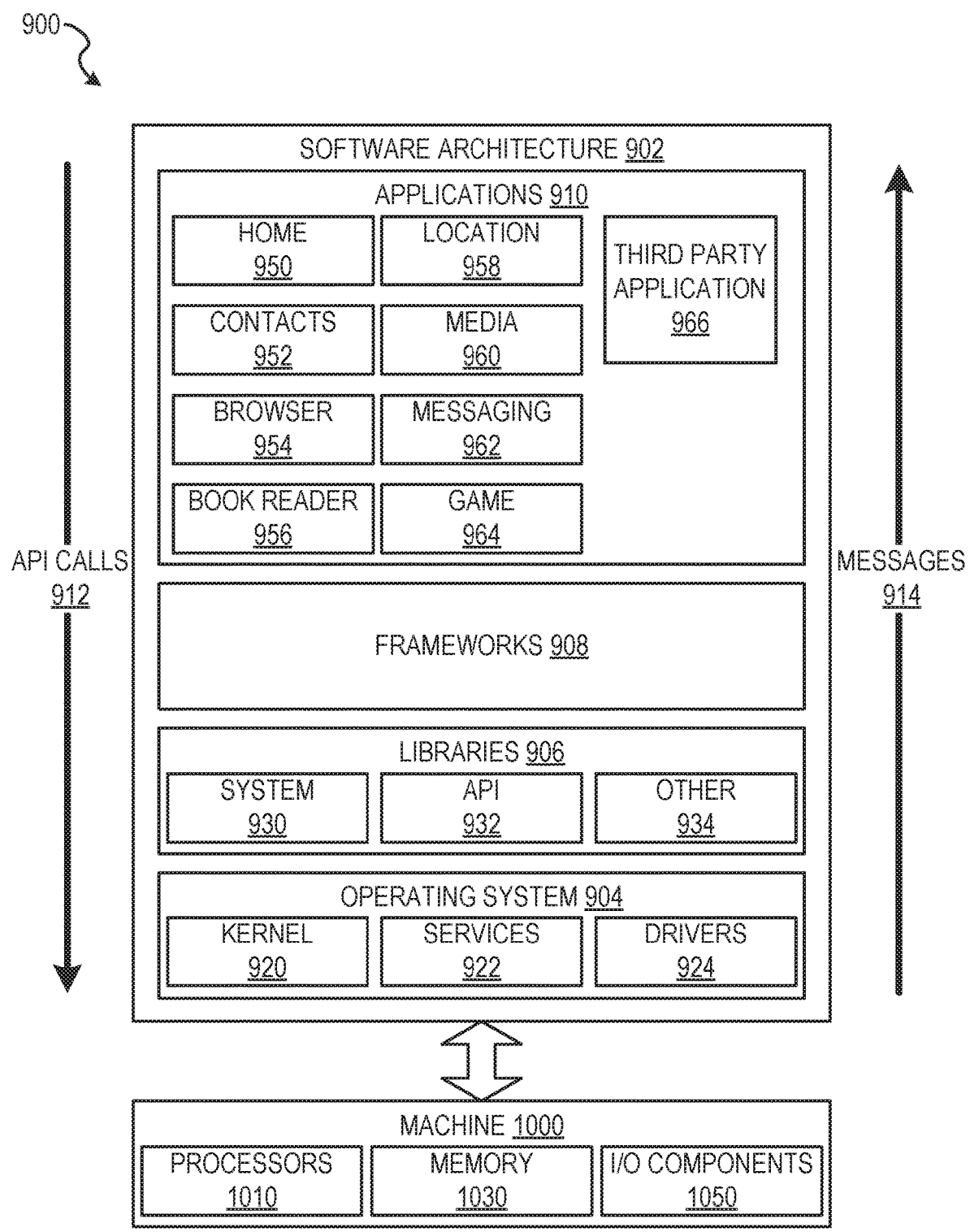
FIG. 17 is a block diagram illustrating an example of a software architecture that may be installed on a machine, according to some example embodiments.

FIG. 17 is a block diagram 900 illustrating an architecture of software 902, which can be installed on the devices described above. FIG. 17 is merely a non-limiting example of a software architecture, and it will be appreciated that many other architectures can be implemented to facilitate the functionality described herein. In various embodiments, the software 902 is implemented by hardware such as a machine 1000 of FIG. 18 that includes processors 1010, memory 1030, and I/O components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™ ANDROID™, WINDOWS® PHONE, or another mobile operating system. In this example, the third-party application 966 can invoke the API calls 912 provided by the operating system 904 to facilitate functionality described herein.

Example Machine Architecture and Machine-Readable Medium

Figure 18:
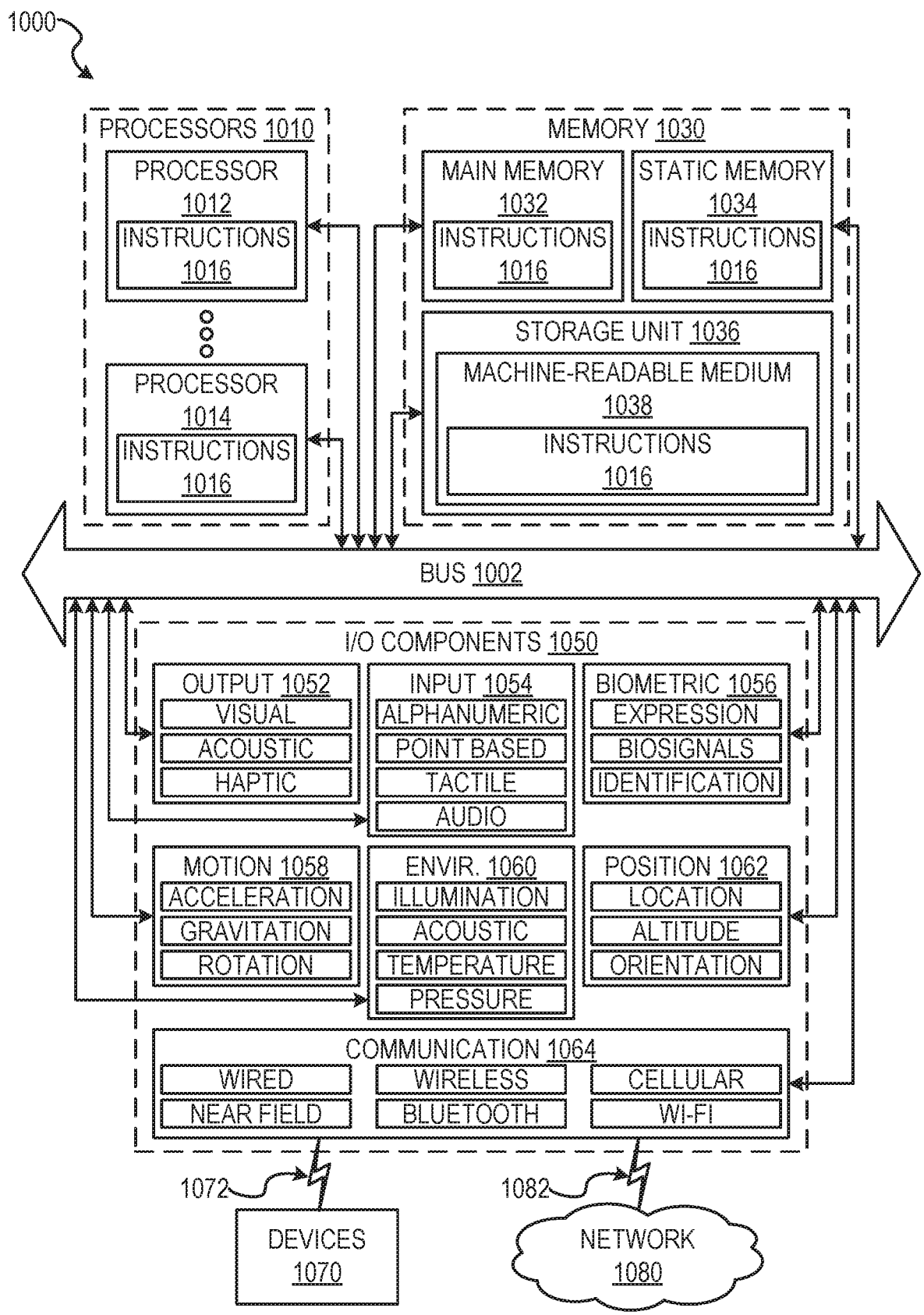
FIG. 18 is a block diagram presenting a diagrammatic representation of a machine in the form of a computer system within which a set of instructions may be executed for causing the machine to perform any of the methodologies discussed herein, according to an example embodiment.

FIG. 18 is a block diagram illustrating components of a machine 1000, according to some embodiments, able to read instructions (e.g., processor-executable instructions) from a machine-readable medium (e.g., a non-transitory processor-readable storage medium or processor-readable storage device) and perform any one or more of the methodologies discussed herein. Specifically, FIG. 18 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) include, for example, a processor 1012 and a processor 1014 that may execute the instructions 1016. The term "processor" is intended to include multi-core processors that may comprise two or more independent processors (also referred to as "cores") that can execute instructions contemporaneously. Although FIG. 18 shows multiple processors, the machine 1000 may include a single processor with a single core, a single processor with multiple cores (e.g., a multi-core processor), multiple processors with a single core, multiple processors with multiple cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown in an example embodiment to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., the instructions 1016) for execution by a machine (e.g., the machine 1000), such that the instructions, when executed by one or more processors of the machine (e.g., the processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 18. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a USB).

Moreover, in some embodiments, the communication components 1064 detect identifiers or include components operable to detect identifiers. For example, the communication components 1064 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., HTTP). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium should be considered as being transportable from one physical location to another. Additionally, since the machine-readable medium 1038 is tangible, the medium may be considered to be a machine-readable device.

Language

Throughout this specification, plural instances may implement components, operations, or structures described as a single instance. Although individual operations of one or more methods are illustrated and described as separate operations, one or more individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving, by one or more processors, a set of images within a video stream depicting a face;
applying a graphical representation of glasses to the face depicted in the video stream;
determining a pixel depth of one or more pixels representing the face;
determining that the pixel depth exceeds a depth value; and
removing a portion of the graphical representation of the glasses in response to determining that the pixel depth exceeds the depth value.

2. The method of claim 1, further comprising:
identifying an obstruction on a portion of the face;
applying the graphical representation of the glasses to the face to obscure the identified obstruction.

3. The method of claim 1, further comprising:
detecting a change in a portion of the face between a first image in the set of images and a second image in the set of images;
in response to detecting the change in the portion of the face, modifying a visual attribute of the graphical representation of the glasses.

4. The method of claim 1, further comprising:
detecting a position change between a first image and a second image in the set of images;
determining one or more visual effects for the graphical representation of the glasses based on the position change;
generating a modified graphical representation of the glasses based on the one or more visual effects and an initial characteristic of the graphical representation of the glasses.

5. The method of claim 1, further comprising:
generating a set of two-dimensional coordinates of the face;
determining a face scale for the face, based at least in part on the set of two-dimensional coordinates;
determining one or more normalization values for the set of two-dimensional coordinates and the face scale, the one or more normalization values determined based on an expected facial range; and
generating a set of normalized two-dimensional coordinates and a normalized face scale.

6. The method of claim 5, wherein generating the set of two-dimensional coordinates further comprises:
determining one or more relative distances between facial features of a set of facial features depicted on the face; and
generating an estimated face size for the portion of the face.

7. The method of claim 6, wherein the expected facial range comprises a first limit and a second limit, the first limit representing an upper portion of the expected facial range and the second limit representing a lower portion of the expected facial range, the method further comprising:
determining that the set of two-dimensional coordinates and the estimated face size correspond to a value less than the second limit of the facial range;
generating a set of correction values for the set of two-dimensional coordinates and the estimated face size; and
generating a set of corrected two-dimensional coordinates and a corrected face size based on the set of two-dimensional coordinates, the estimated face size, and the set of correction values.

8. The method of claim 5, wherein applying the graphical representation of the glasses further comprises:
identifying one or more first attachment points within the set of two-dimensional coordinates;
identifying one or more second attachment points within the graphical representation of the glasses; and
positioning at least one second attachment point of the graphical representation of the glasses proximate to at least one first attachment point of the set of two-dimensional coordinates.

9. The method of claim 1, further comprising:
identifying one or more dimensions of the graphical representation of the glasses, the graphical representation of the glasses having a first size comprising the one or more dimensions; and
modifying the one or more dimensions to scale the graphical representation of the glasses to fit the face, the modifying of the one or more dimensions maintaining a set of proportions of the graphical representation of the glasses.

10. The method of claim 1, further comprising:
receiving one or more selections corresponding to a set of glasses characteristics of the graphical representation of the glasses;
identifying one or more glasses characteristics from the set of glasses characteristics indicated by the one or more selections; and
rendering the graphical representation of the glasses depicting at least a portion of the one or more glasses characteristics.

11. The method of claim 1, wherein the graphical representation of the glasses is a first graphical representation of first glasses, further comprising:
detecting that the face is a first face of a plurality of faces depicted in the set of images;
applying a second graphical representation of second glasses to a second face of the plurality of faces depicted in the set of images; and
simultaneously presenting the first face with the first graphical representation and the second face with the second graphical representation.

12. The method of claim 1, further comprising depicting a reflection of a real-world visual aspect depicted in the video stream on lenses of the graphical representation of the glasses.

13. The method of claim 1 further comprising:
detecting a first change in a first face characteristic between a first image in the set of the images and a second image in the set of the images;
detecting a second change in a second face characteristic between the first image and the second image;
in response to detecting the first change, modifying a first visual attribute of the graphical representation of the glasses; and
in response to detecting the second change, modifying a second visual attribute of the graphical representation of the glasses.

14. The method of claim 13, wherein the first change corresponds to an eye blink and causes the first visual attribute comprising a color of the glasses to be modified.

15. The method of claim 14, wherein the second change corresponds to movement of an eyebrow or mouth position and causes the second visual attribute comprising a style of the glasses to be modified.

16. A device comprising:
one or more processors; and
a non-transitory processor-readable storage medium coupled to the one or more processors, the non-transitory processor-readable storage medium storing processor-executable instructions that, when executed by the one or more processors, cause the one or more processors to perform operations comprising:
receiving a set of images within a video stream depicting a face;
applying a graphical representation of glasses to the face depicted in the video stream;
determining a pixel depth of one or more pixels representing the face;
determining that the pixel depth exceeds a depth value; and
removing a portion of the graphical representation of the glasses in response to determining that the pixel depth exceeds the depth value.

17. The device of claim 16, wherein the operations further comprise:
identifying an obstruction on a portion of the face;
applying the graphical representation of the glasses to the face to obscure the identified obstruction.

18. The device of claim 16, wherein the operations further comprise:
detecting a change in a portion of the face between a first image in the set of images and a second image in the set of images;
in response to detecting the change in the portion of the face, modifying a visual attribute of the graphical representation of the glasses.

19. The device of claim 16, wherein the operations further comprise:
detecting a position change between a first image and a second image in the set of images;
determining one or more visual effects for the graphical representation of the glasses based on the position change;
generating a modified graphical representation of the glasses based on the one or more visual effects and an initial characteristic of the graphical representation of the glasses.

20. A non-transitory processor-readable storage medium storing processor-executable instructions that, when executed by one or more processors of a machine, cause the machine to perform operations comprising:
receiving a set of images within a video stream depicting a face;
applying a graphical representation of glasses to the face depicted in the video stream;
determining a pixel depth of one or more pixels representing the face;
determining that the pixel depth exceeds a depth value; and
removing a portion of the graphical representation of the glasses in response to determining that the pixel depth exceeds the depth value.

* * * * *

UNITED STATES PATENT AND TRADEMARK OFFICE
CERTIFICATE OF CORRECTION

PATENT NO. : 10,891,797 B1
APPLICATION NO. : 16/561610
DATED : January 12, 2021
INVENTOR(S) : Poliakov et al.

Page 1 of 1

It is certified that error appears in the above-identified patent and that said Letters Patent is hereby corrected as shown below:

In the Claims

In Column 27, Line 35, in Claim 16, delete "stream," and insert --stream;-- therefor Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*